United States Patent
Yasuda et al.

(10) Patent No.: US 11,720,178 B2
(45) Date of Patent: Aug. 8, 2023

(54) INFORMATION PROCESSING DEVICE, INFORMATION PROCESSING METHOD, AND COMPUTER-READABLE RECORDING MEDIUM

(71) Applicant: SONY GROUP CORPORATION, Tokyo (JP)

(72) Inventors: Ryouhei Yasuda, Tokyo (JP); Takuro Noda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/429,806

(22) PCT Filed: Mar. 3, 2020

(86) PCT No.: PCT/JP2020/008826
§ 371 (c)(1),
(2) Date: Aug. 10, 2021

(87) PCT Pub. No.: WO2020/189254
PCT Pub. Date: Sep. 24, 2020

(65) Prior Publication Data
US 2022/0129080 A1    Apr. 28, 2022

(30) Foreign Application Priority Data

Mar. 15, 2019  (JP) ................. 2019-048684

(51) Int. Cl.
*G06F 3/01*       (2006.01)
*H04N 13/383*   (2018.01)

(52) U.S. Cl.
CPC .............. *G06F 3/017* (2013.01); *G06F 3/012* (2013.01); *G06F 3/013* (2013.01); *H04N 13/383* (2018.05)

(58) Field of Classification Search
CPC .......... G06F 3/017; G06F 3/012; G06F 3/013; G06F 3/0481; G06F 3/0484;
(Continued)

(56) References Cited

U.S. PATENT DOCUMENTS 6,323,884 B1 * 11/2001 Bird .................... G06F 3/04812
715/810
8,793,620 B2 *  7/2014 Stafford .............. G06F 3/04842
715/858
(Continued)

FOREIGN PATENT DOCUMENTS

JP    H08-030380 A    2/1996
JP    2000-047823 A   2/2000
(Continued)

*Primary Examiner* — Mihir K Rayan
(74) *Attorney, Agent, or Firm* — Paratus Law Group, PLLC

(57) ABSTRACT

An information processing device includes an eyeball information acquisition section, a sightline estimation section, a display control section, a gesture information acquisition section, and a mode switching section. The eyeball information acquisition section acquires position and posture information of eyeballs of a user from a first sensor. The sightline estimation section estimates a sightline vector on the basis of the position and posture information of the eyeballs. The display control section controls a display device in such a manner that the display device displays a guide image for showing a gaze state based on the sightline vector. The gesture information acquisition section acquires gesture information, which is different from the position and posture information of the eyeballs, from a second sensor. The mode switching section switches between a first mode and a second mode according to mode switching input provided by the user with regard to the guide image, the first mode being a mode of reflecting the position and posture information of the eyeballs in the guide image, the second (Continued)

mode being a mode of correcting the gaze state on the basis of the gesture information.

24 Claims, 17 Drawing Sheets

(58) Field of Classification Search
CPC .......... H04N 13/383; G02B 2027/0138; G02B 2027/0187; G02B 27/0093; G02B 27/0172
See application file for complete search history.

(56) References Cited

U.S. PATENT DOCUMENTS

| | | | |
|---|---|---|---|
| 8,947,323 B1* | 2/2015 | Raffle | G02B 27/0093 345/157 |
| 10,496,186 B2* | 12/2019 | Yasuda | G06F 3/16 |
| 2006/0267934 A1* | 11/2006 | Harley | G06F 3/03548 345/157 |
| 2013/0169560 A1* | 7/2013 | Cederlund | G06F 3/013 345/173 |
| 2013/0241925 A1* | 9/2013 | Konami | G06F 3/013 345/419 |
| 2014/0247277 A1* | 9/2014 | Guenter | G06T 11/00 345/611 |
| 2015/0135132 A1* | 5/2015 | Josephson | H04W 4/021 715/784 |
| 2015/0331485 A1 | 11/2015 | Wilairat et al. | |
| 2017/0235360 A1* | 8/2017 | George-Svahn | G02B 27/017 345/173 |
| 2018/0081178 A1* | 3/2018 | Shpunt | H04N 13/38 |
| 2023/0047470 A1* | 2/2023 | Noda | G06T 7/337 |

FOREIGN PATENT DOCUMENTS

| | | |
|---|---|---|
| JP | 2009-064395 A | 3/2009 |
| JP | 2013-524390 A | 6/2013 |
| JP | 2014-211794 A | 11/2014 |
| JP | 2014-235729 A | 12/2014 |
| WO | WO 2015/170520 A1 | 11/2015 |
| WO | WO 2018/222753 A1 | 12/2018 |

* cited by examiner

INFORMATION PROCESSING DEVICE, INFORMATION PROCESSING METHOD, AND COMPUTER-READABLE RECORDING MEDIUM

CROSS REFERENCE TO PRIOR APPLICATION

This application is a National Stage Patent Application of PCT International Patent Application No. PCT/JP2020/008826 (filed on Mar. 3, 2020) under 35 U.S.C. § 371, which claims priority to Japanese Patent Application No. 2019-048684 (filed on Mar. 15, 2019), which are all hereby incorporated by reference in their entirety.

TECHNICAL FIELD

The present technology relates to an information processing device, an information processing method, and a computer-readable recording medium for performing an operation or the like through gaze of a user.

BACKGROUND ART

Conventionally, technologies of detecting a sightline of a user have been developed. For example, by using a result of detecting a sightline of a user, it is possible to perform a selection operation or the like through the sightline. For example, the user can select a target or the like gazed at by the user.

Patent Literature 1 discloses a head mounted terminal that makes it possible to select an icon by using a sightline of a user. This head mounted terminal is provided with a gyro sensor for detecting movement of the neck of the user. For example, display positions, intervals, and the like of icons displayed in a display region are changed according to the movement of the neck of the user, which is detected by the gyro sensor, in such a manner that the icons are easily selected through a sightline. This makes it possible to easily select an icon through gaze input, for example (see paragraphs [0021], [0029], [0024], [0036], FIG. 2, and the like of Patent Literature 1).

CITATION LIST

Patent Literature

Patent Literature 1: WO 2015/170520 A1

DISCLOSURE OF INVENTION

Technical Problem

The technologies of selecting a target through gaze has been expected to be applied to wide fields such as amusement, education, and shopping, and technologies capable of improving operability of performing a selection operation through gaze have been desired.

In view of the circumstances as described above, a purpose of the present technology is to provide an information processing device, an information processing method, and a computer-readable recording medium for improving operability of performing a selection operation through gaze.

Solution to Problem

To achieve the above-described purpose, an information processing device according to an embodiment of the present technology includes an eyeball information acquisition section, a sightline estimation section, a display control section, a gesture information acquisition section, and a mode switching section.

The eyeball information acquisition section acquires position and posture information of eyeballs of a user from a first sensor.

The sightline estimation section estimates a sightline vector of the user on the basis of the position and posture information of the eyeballs.

The display control section controls a display device in such a manner that the display device displays a guide image for showing a gaze state based on the estimated sightline vector.

The gesture information acquisition section acquires gesture information of the user, which is different from the position and posture information of the eyeballs, from a second sensor.

The mode switching section switches between a first mode and a second mode according to mode switching input provided by the user with regard to the guide image, the first mode being a mode of reflecting the position and posture information of the eyeballs in the guide image, the second mode being a mode of correcting the gaze state on the basis of the gesture information.

The information processing device acquires the position and posture information of the eyeballs of the user and estimates the sightline vector on the basis of the position and posture information of the eyeballs. The display device displays the guide image for showing the gaze state based on the sightline vector. In addition, the information processing device switches between the first mode and the second mode according to the mode switching input for switching between the modes related to the guide image, the first mode being a mode of reflecting the position and posture information of the eyeballs in the guide image, the second mode being a mode of correcting the gaze state on the basis of the gesture information, which is different from the position and posture information of the eyeballs. This makes it possible to improve operability of performing a selection operation through gaze.

The information processing method according to an embodiment of the present technology is an information processing method to be executed by a computer system. The information processing method includes acquisition of the position and posture information of the eyeballs of the user from the first sensor.

A sightline vector of the user is estimated on the basis of the position and posture information of the eyeballs.

The display device is controlled in such a manner that the display device displays the guide image for showing the gaze state based on the estimated sightline vector.

The gesture information of the user, which is different from the position and posture information of the eyeballs, is acquired from the second sensor.

A switch is made between the first mode and the second mode according to mode switching input provided by the user with regard to the guide image, the first mode being a mode of reflecting the position and posture information of the eyeballs in the guide image, the second mode being a mode of correcting the gaze state on the basis of the gesture information.

The computer-readable recording medium according to an embodiment of the present technology records a program for causing a computer system to execute the following steps including:

a step of acquiring position and posture information of eyeballs of a user from the first sensor;

a step of estimating a sightline vector of the user on the basis of the position and posture information of the eyeballs;

a step of controlling the display device in such a manner that the display device displays a guide image for showing a gaze state based on the estimated sightline vector;

a step of acquiring gesture information of the user, which is different from the position and posture information of the eyeballs, from the second sensor; and a step of switching between the first mode and the second mode according to mode switching input provided by the user with regard to the guide image, the first mode being a mode of reflecting the position and posture information of the eyeballs in the guide image, the second mode being a mode of correcting the gaze state on the basis of the gesture information.

MODE(S) FOR CARRYING OUT THE INVENTION

Hereinafter, embodiments of the present technology will be described with reference to the drawings.

[Configuration of HMD]

Figure 1:
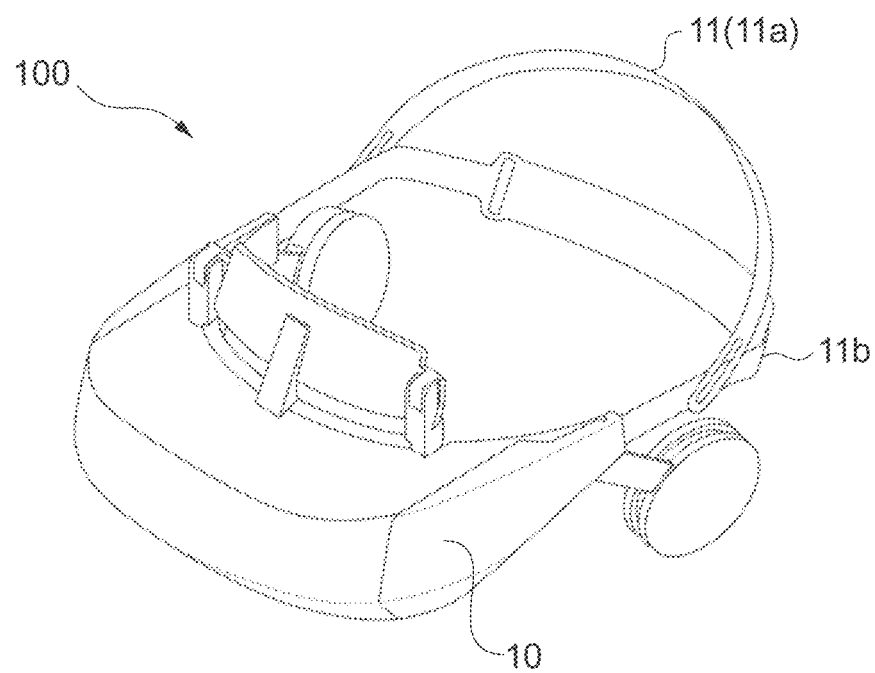
FIG. 1 is a perspective view of appearance of a head-mounted display according to an embodiment of the present technology.
Figure 2:
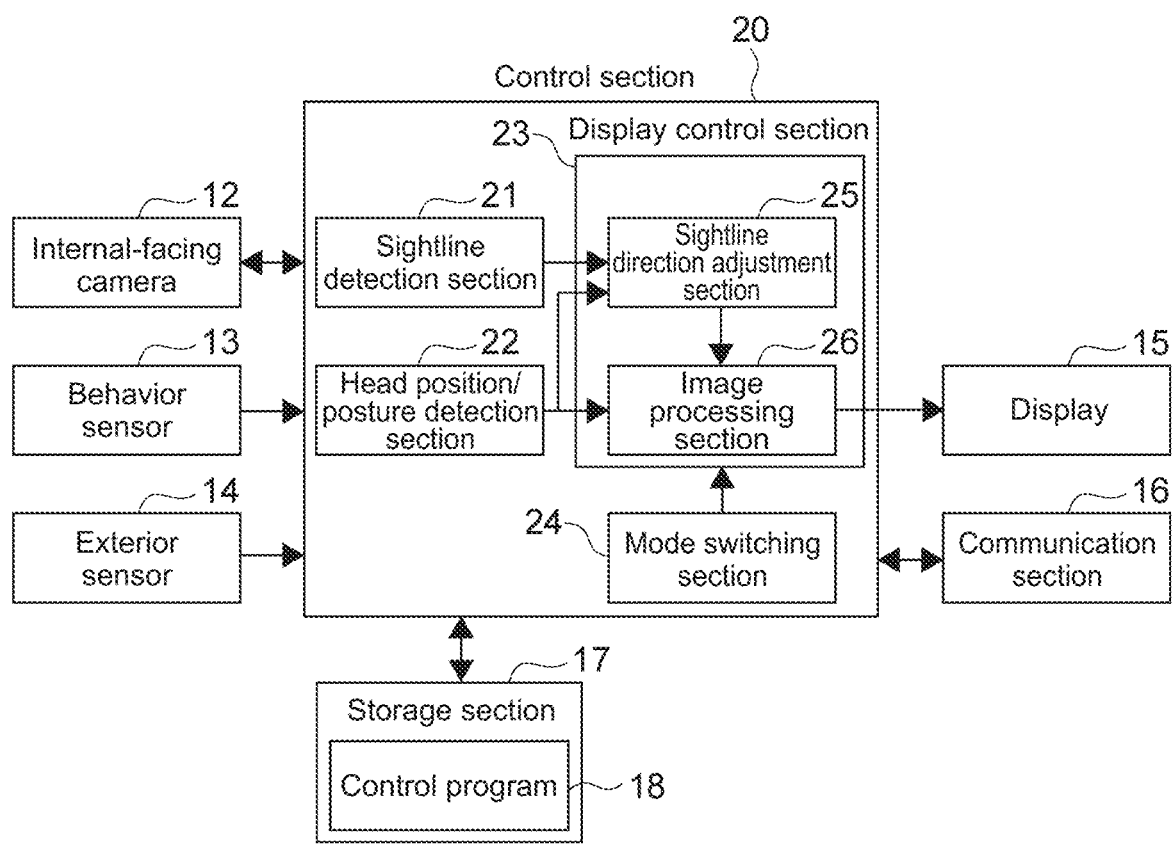
FIG. 2 is a block diagram illustrating a functional configuration example of the HMD.

FIG. 1 is a perspective view of appearance of a head-mounted display (HMD) according to an embodiment of the present technology. FIG. 2 is a block diagram illustrating a functional configuration example of an HMD 100. The HMD 100 is used while the HMD 100 is worn on a head of a user. The HMD 100 functions as a display device that displays an image in a field of view of the user. When wearing the HMD 100, it is possible for the user to experience virtual reality (VR), augmented reality, or the like, for example.

As illustrated in FIG. 1, the HMD 100 includes a base part 10 and wearable bands 11. The base part 10 is a part to be positioned in front of left and right eyes of the user. The base part 10 is configured in such a manner that the base part 10 covers the field of view of the user, and the base part 10 functions as a casing that stores a display 15 for displaying the image.

The wearable bands 11 are worn on the head of the user. As illustrated in FIG. 1, the wearable bands 11 include a side head band 11a and a top head band 11b. The side head band 11a is connected to the base part 10, and is worn around the head of the user including sides and the back of the head. The top head band 11b is connected to the side head band 11a, and is worn around the head of the user including the sides and the top of the head. This makes it possible to hold the base part 10 in front of the eyes of the user.

As illustrated in FIG. 2, the HMD 100 further includes an internal-facing camera 12, a behavior sensor 13, an exterior sensor 14, the display 15, a communication section 16, a storage section 17, and a controller 20.

The internal-facing camera 12 captures an image of eyeballs of the user. An eyeball image that captures the eyeballs of the user is used for a process of detecting a sightline vector of the user, which will be described later. The internal-facing camera 12 includes a left eye camera and a right eye camera that are positioned inside the base part 10 in such a manner that the left eye camera and the right eye camera capture images of left and right eyes of the user, for example. According to the present embodiment, the internal-facing camera 12 corresponds to a first sensor.

For example, a digital camera including an image sensor such as a complementary metal oxide semiconductor (CMOS) sensor a charge coupled device (CCD) sensor is be used as the internal-facing camera 12 (the left eye camera and the right eye camera). Alternatively, for example, an infrared camera provided with an infrared light source such as an infrared LED may be used. This makes it possible to capture an infrared image of the eyeballs, and it is possible to detect a sightline vector of the user with high accuracy, for example. The specific configuration of the internal-facing camera 12 not limited.

The behavior sensor 13 is a sensor that detects information related to movement of the HMD 100. For example, the behavior sensor 13 is fixed at a predetermined position in or on the base part 10, and detects tilt, rotation, and the like of the HMD 100. Therefore, it can also be said that the behavior sensor 13 is a sensor that detects information related to movement of the head of the user who is wearing the HMD 100. According to the present embodiment, the behavior sensor 13 corresponds to a second sensor.

For example, an inertial measurement unit (IMU) or the like may be used as the behavior sensor 13. For example, the inertial measurement unit is a sensor that detects three-dimensional angular velocity and acceleration by using a triaxial gyroscope and accelerometer. In addition, for example, a 9-axis sensor or the like including the triaxial gyroscope and accelerometer and a triaxial speedometer may be use as the behavior sensor 13. In addition, the type of the behavior sensor 13 is not limited. Any sensor capable of detecting behavior of the HMD 100 may be used.

The exterior sensor 14 is a sensor that detects information related to the outside of the HMD 100. A digital camera (external-facing camera) or the like that captures an image of a front of the HMD 100 (a front of the user) is used as the exterior sensor 14. In addition, for example, a camera or the like including a stereo camera, time-of-flight (ToF) sensor, or the like, which makes it possible to detect depth information or the like in a real space, may be used as the exterior sensor 14. For example, by displaying an image detected by the exterior sensor 14 on the display 15, it is possible to provide AR experience or the like. Alternatively, a radar sensor, a LiDAR sensor, or the like may be installed as the exterior sensor 14.

The display 15 is installed on the base part 10 in such a manner that the display 15 covers at least a portion of a field of view of the user. For example, the two displays 15 are positioned in the field of view of the user in such a manner that the two displays 15 display a left eye image and a right eye image. Alternatively, the single display 15 may be adopted in such a manner that the single display 15 displays the left eye image and the right eye image. In addition, a lens or the like may be installed between the left eye and the right eye of the user in such a manner that the lens or the like adjusts a focus, for example.

For example, an organic EL display, a liquid-crystal display (LCD), or the like is used as the display 15. In addition, the specific configuration of the display 15 is not limited. According to the embodiment, the display 15 corresponds to the display device.

The communication section 16 is a module that performs network communication, near field wireless communication, or the like with another device. For example, a wireless LAN module for Wi-Fi or the like, a communication module for Bluetooth (registered trademark) or the like may be installed as the communication section 16.

In addition, the communication section 16 communicates with an input device (not illustrated) that receives operation input or the like provided by the user with his/her hand. For example, a device (such as a game controller) provided with a selection button, an analog stick, a switch, and the like is used as the input device. The type and the like of the input device are not limited. For example, a keyboard or the like may be used as the input device.

The storage section 17 is a non-volatile storage device. For example, a recording medium using a solid-state device such as a solid-state drive (SSD) or a magnetic recording medium such as a hard disk drive (HDD) is used as the storage section 17. In addition, the type and the like of the recording medium to be used as the storage section 17 are not limited. For example, any recording medium that records data not temporarily may be used.

The storage section 17 stores a control program 18 for controlling overall behavior of the HMD 100. The control program 18 is a program according to the present embodiment, and the storage section 17 corresponds to a computer-readable recording medium having the program recorded thereon.

The controller 20 controls behavior of respective blocks included in the HMD 100. For example, the controller 20 has a hardware configuration that is necessary for a computer such as a CPU and memory (RAM and ROM). Various kinds of processes are executed when the CPU loads the control program 18 stored in the storage section 17 into the RAM and executes the control program. According to the embodiment, the controller 20 corresponds to an information processing device.

For example, a programmable logic device (PLD) such as a field programmable gate array (FPGA), or another device such as an application specific integrated circuit (ASIC) may be used as the controller 20. Alternatively, for example, a processor such as a graphics processing unit (GPU) may be used as the controller 20.

Note that the controller 20 and the storage section 17 may be prepared independently from a main body of the HMD 100. For example, the HMD 100 may be controlled when the main body of the HMD 100 communicates with the controller 20 or the like via the communication section (not illustrated) or the like. This makes it possible to suppress power consumption of the main body of the HMD 100 and increase operating time of the HMD 100.

According to the present embodiment, the CPU of the controller 20 executes the program according to the present embodiment, and thereby a sightline detection section 21, a head position and posture detection section 22, a display control section 23, and a mode switching section 24 are implemented as functional blocks. In addition, such functional blocks execute an information processing method according to the present embodiment. Note that, it is also possible to appropriately use dedicated hardware such as an integrated circuit (IC) to implement the respective functional blocks.

The sightline detection section 21 detects a sightline of the user on the basis of position and posture information of the eyeballs of the user. Here, the position and posture information of the eyeballs of the user is information capable of detecting positions and postures of the eyeballs of the user. For example, information for detecting an interval between the left and right eyeballs, anteroposterior positions of the eyeballs, orientations (postures) of the eyeballs of the user, or the like serves as the position and posture information of the eyeballs.

According to the present embodiment, the sightline detection section 21 acquires the position and posture information of the eyeballs of the user from the internal-facing camera 12. Specifically, an eyeball image captured by the internal-facing camera 12 is appropriately loaded as the position and posture information of the eyeballs of the user. Therefore, according to the present embodiment, the eyeball image serves as the position and posture information of the eyeballs of the user.

In addition, the sightline detection section 21 estimates a sightline vector of the user on the basis of the position and posture information of the eyeballs. In other words, the sightline vector of the user is estimated on the basis of the eyeball image captured by the internal-facing camera 12. The sightline vector is a vector indicating a result of estimating a sightline direction of the user. For example, the sightline vector is detected as a vector in a predetermined coordinate system, which is used by the HMD 100 (controller 20). According to the present embodiment, the sightline detection section 21 functions as an eyeball information acquisition section and a sightline estimation section.

For example, the sightline vector is estimated through corneal reflections. When using the corneal reflections, an image of the eyeballs is captured by using the infrared camera (internal-facing camera 12) and the infrared light source, for example. In this case, the eyeball image includes bright points (Purkinje images), which arise when infrared light is reflected by corneas or the like. The sightline vector is estimated on the basis of the bright points of the infrared light and pupil positions. When using the corneal reflections, it is possible to accurately detect the sightline vector.

In addition, for example, it is also possible to use a method or the like for estimating a sightline vector on the basis of feature points such as outer corners of the eyes by using the eyeball image. When using such a method, there is no need to prepare the infrared light source or the like, for example. Therefore, it is possible to reduce the number of parts. In addition, the method of estimating the sightline vector by using the eyeball image is not limited. It is also possible to use a method or the like for estimating a sightline vector through machine learning or the like.

According to the present embodiment, for example, respective sightline vectors of the left and right eyeballs are estimated, and these vectors are combined appropriately. Thereby, a single sightline vector is estimated. The present technology is not limited thereto. For example, the present technology is also applicable to the case of using respective sightline vectors estimated with regard to the left and right eyeballs. Note that, estimation errors may be caused by the estimation process of the sightline vectors. Accordingly, the sightline vector does not necessarily match an actual direction seen by the user. Details thereof will be described later.

The head position and posture detection section 22 loads a detection result of the behavior sensor 13, and detects a position and posture of the head of the user. In addition, the head position and posture detection section 22 detects a rotation direction and a rotation angle of the head of the user, which are associated with a head gesture when the user rotates his/her head.

As described above, the behavior sensor 13 detects information related to movement of the HMD 100, that is, information related to movement of the head of the user. Therefore, the detection result of the behavior sensor 13 (such as speed, acceleration, and angular velocity of the head) serves as the information related to the head gesture (hereinafter, referred to as head gesture information) when the user rotates his/her head.

As described above, the head position and posture detection section 22 acquires the head gesture information from the behavior sensor 13. According to the present embodiment, the head gesture information is an example of gesture information of the user, which is different from the position and posture information of the eyeballs. In addition, according to the present embodiment, the head position and posture detection section 22 corresponds to a gesture information acquisition section.

The head position and posture detection section 22 detects a position and posture of the head of the user on the basis of the detection result of the behavior sensor 13. For example, the position of the head is detected by estimating a movement direction of the head. For example, the position of the head serves as a basic point of the sightline direction of the user (point of view). In addition, for example, the posture of the head is detected on the basis of tilt or the like of the head.

In addition, the head position and posture detection section 22 detects a rotation direction and a rotation angle of the head of the user. For example, an amount of change in the posture of the head is calculated on the basis of the posture of the head obtained at a certain timing. The rotation direction, the rotation angle, and the like of the head are detected on the basis of the above-described amount of change. A method of detecting the position, posture, rotation direction, rotation angle, and the like of the head is not limited.

The display control section 23 controls display of an image on the display 15 of the HMD 100. In other words, it can be said that the display control section 23 controls the display 15 in such a manner that the display 15 displays an appropriate image depending on a situation. According to the present embodiment, the display control section 23 includes a sightline direction adjustment section 25 and an image processing section 26.

The sightline direction adjustment section 25 corrects (adjusts) the sightline vector detected by the sightline detection section 21, according to a head gesture made by the user. For example, the sightline vector is corrected by rotating the sightline vector on the basis of the rotation direction, rotation angle, and the like of the head of the user detected by the head position and posture detection section 22. Details of a method of correcting the sightline vector will be described later.

Note that, the sightline vector is corrected depending on a mode designated by the mode switching section 24 (to be described later). For example, the sightline direction adjustment section 25 turns on a mode (first mode) of not correcting the sightline vector or a mode (second mode) of correcting the sightline vector, in accordance with the designated mode. For example, in the first mode, the information regarding the sightline vector detected by the sightline detection section 21 is output to the image processing section 26 without any correction. Alternatively, in the second mode, information regarding a corrected sightline vector is output to the image processing section 26.

The image processing section 26 generates an image to be displayed on the display 15. For example, the image processing section 26 acquires content information regarding content to be executed by the HMD 100, and generates a content image according to the position and posture of the head of the user (HMD 100).

In addition, the image processing section 26 generates a guide image indicating a gaze state based on the sightline vector. Here, for example, the gaze state means a state of visual behavior of the user. For example, it is possible to indicate the gaze state by visualizing a position, object, or the like, which the user is gazing at. Therefore, examples of the gaze state based on the sightline vector include a gaze position P, a gaze object, and the like calculated by using the sightline vector.

The image processing section 26 calculates the gaze position P on the basis of the sightline vector output from the sightline direction adjustment section 25. Therefore, a gaze position P based on an uncorrected sightline vector is calculated in the first mode, and a gaze position P based on a corrected sightline vector is calculated in the second mode.

In addition, for example, the information regarding content or the like is used for calculating the gaze position P. For example, a position where a sightline vector intersects with a virtual object displayed in a virtual space is calculated as the gaze position P. In addition, a virtual object including the gaze position P, that is, a virtual object intersecting with the sightline vector is detected as the gaze object. A method of calculating the gaze position P, a method of detecting the gaze object, and the like are not limited.

Figure 3:
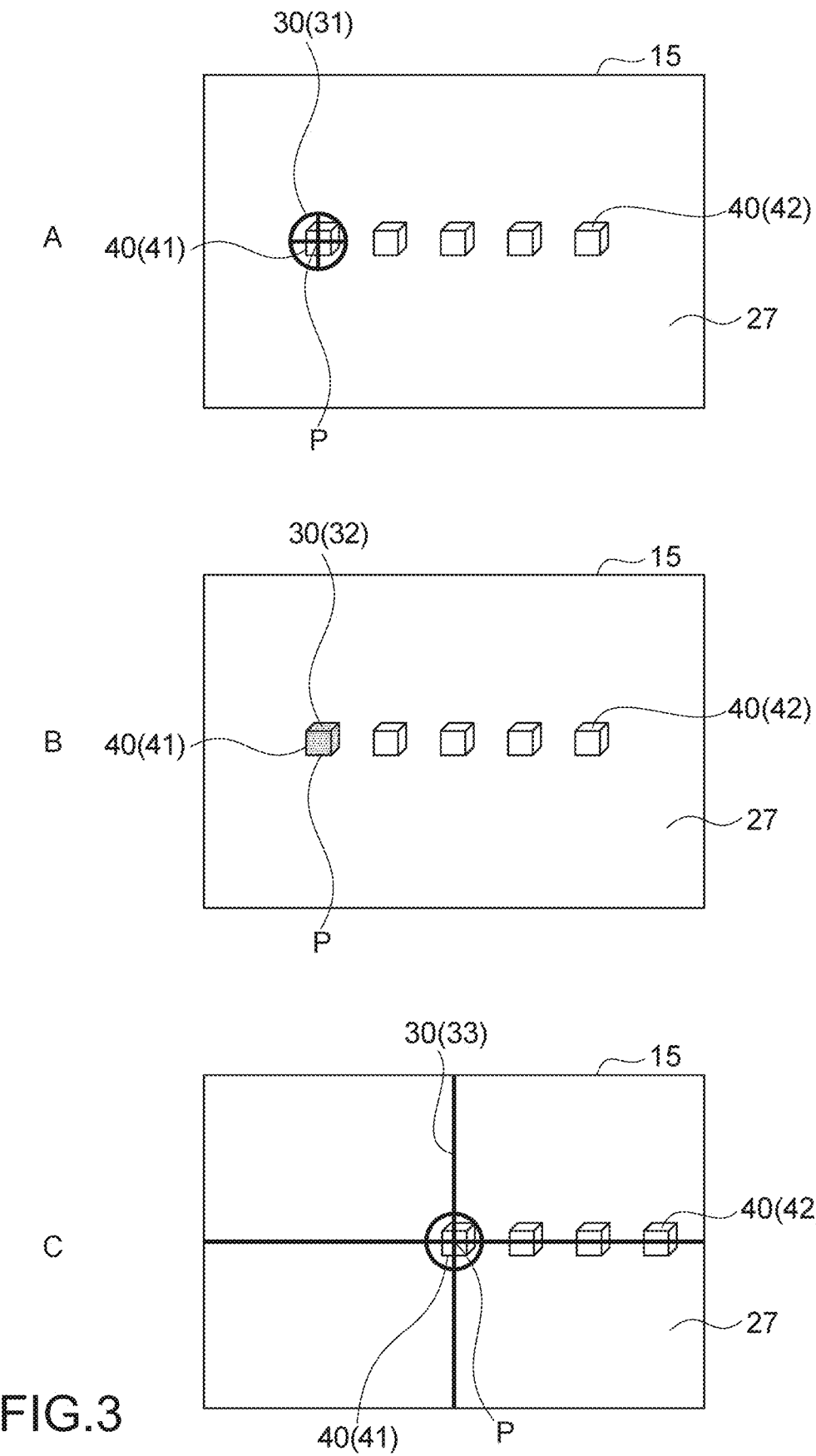
FIG. 3 is a schematic diagram illustrating examples of a guide image.

FIG. 3 is a schematic diagram illustrating examples of a guide image. FIG. 3A to FIG. 3C schematically illustrate different types of guide images 30. Note that, the respective guide images 30 illustrated in FIG. 3A to FIG. 3C are images calculated by using a same sightline vector.

The guide image 30 illustrated in FIG. 3A is a pointer image 31 (pointer object). The pointer image 31 is an image indicating the gaze position P calculated on the basis of the sightline vector. The pointer image 31 is the guide image 30 displayed on any position on the display 15 according to the sightline vector. In the example illustrated in FIG. 3A, the pointer image 31 includes two lines that are perpendicular to each other, and a circle centered at an intersection of the two lines. The pointer image 31 indicates the gaze position P by using the intersection of the two lines (center of the circle).

FIG. 3A illustrates a content image 27 including five virtual objects 40 (cubes), which are aligned in a line in a horizontal direction. Among the above described images, the pointer image 31 is displayed in such a manner that the pointer image 31 overlaps a leftmost virtual object 40. This makes it possible to display a visualized gaze position P (sightline vector) calculated by the HMD 100 (controller 20).

As described above, the guide image 30 (pointer image 31) illustrated in FIG. 3A is an image indicating a gaze state by using the gaze position P based on the sightline vector. Note that, as described above, the sightline vector has an estimation error. Therefore, the gaze position P is not necessarily a position which the user is actually gazing at.

The guide image 30 illustrated in FIG. 3B is a highlighted image 32 displayed in such a manner that a virtual object 40 is highlighted. In the highlighted image 32, a virtual object 40 intersecting with the sightline vector, that is, the virtual object 40 including the gaze position P is emphasized. Hereinafter, the virtual object 40 including the gaze position P is referred to as a gaze object 41. Note that, the five virtual objects 40 displayed on the display 15 is a candidate object 42 serving as a candidate for the gaze object 41.

For example, the highlighted image 32 is an image in which the gaze object 41 included in the content image 27 is highlighted. In other words, the guide image 30 also includes an image including a portion of the content image 27, which is emphasized in such a manner that the portion indicates the gaze state. As described above, the guide image 30 (highlighted image 32) illustrated in FIG. 3B is an image indicating the gaze state by using the gaze object 41 including the gaze position P. Note that, in a way similar to the gaze position P, the gaze object 41 is not necessarily an object which the user is actually gazing at.

The guide image 30 illustrated in FIG. 3C is a scope image 33 displayed at a predetermined position on the display 15. The scope image 33 is an image indicating the gaze state by using the gaze position P based on the sightline vector. The scope image 33 is displayed at a specified portion on the display 15, unlike the pointer image 31 illustrated in FIG. 3A.

For example, the scope image 33 is displayed in such a manner that the scope image 33 is located at a center of the display 15. In this case, a display range or the like of the content image 27 is appropriately adjusted in such a manner that the center of the scope image 33 (the center of the display 15) overlaps the gaze position P. Therefore, in the example illustrated in FIG. 3C, a display content (content image 27) moves in tandem with the sightline of the user.

Note that, the guide images 30 illustrated in FIG. 3A to FIG. 3C may be used independently, or may be used in combination. For example, it is possible to perform a process of emphasizing a virtual object 40 overlapped with the pointer image 31, as the highlighted image 32. Alternatively, for example, a combination of the scope image 33 and the highlighted image 32 may be used.

As described above, the display control section 23 (the sightline direction adjustment section 25 and the image processing section 26) controls the display 15 in such a manner that the display 15 displays the guide image 30 for showing the gaze state based on the estimated sightline vector. For example, when the gaze position or the gaze object is displayed, it is possible for the user to perform a selection operation or the like through gaze.

The mode switching section 24 switches between the first mode and the second mode according to mode switching input. The mode switching input is input information for designating initiation and termination of the second mode of correcting the sightline vector, for example. In addition, the mode switching section determines the mode switching input on the basis of an initiation condition and a termination condition of the second mode. In response to a result of the determination, the first mode and the second mode are switched and one of the modes is executed. Details of the type of the mode switching input, a determination condition regarding the mode switching input, and the like will be described later.

In the first mode, the sightline vector detected by the sightline detection section 21 is not corrected and the guide image 30 is generated by using the raw sightline vector. In other words, it can be said that the first mode is a mode of reflecting the position and posture information of the eyeballs of the user in the guide image 30.

The second mode is a mode of correcting the sightline vector detected by the sightline detection section 21 on the basis of the head gesture information. Therefore, in the second mode, a guide image is generated by using a corrected sightline vector. In other words, it can be said that the second mode is a mode of correcting the gaze state (the gaze position P and the gaze object) on the basis of the head gesture information.

As described above, the mode switching section 24 switches between the first mode and the second mode according to mode switching input provided by the user with regard to the guide image 30, the first mode being the mode of reflecting the position and posture information of the eyeballs in the guide image 30, the second mode being the mode of correcting the gaze state on the basis of the head gesture information. In other words, the HMD 100 executes the mode of using a raw sightline vector without any correction or the mode of correcting a sightline vector and correcting the gaze position P by switching between these modes.

Figure 4:
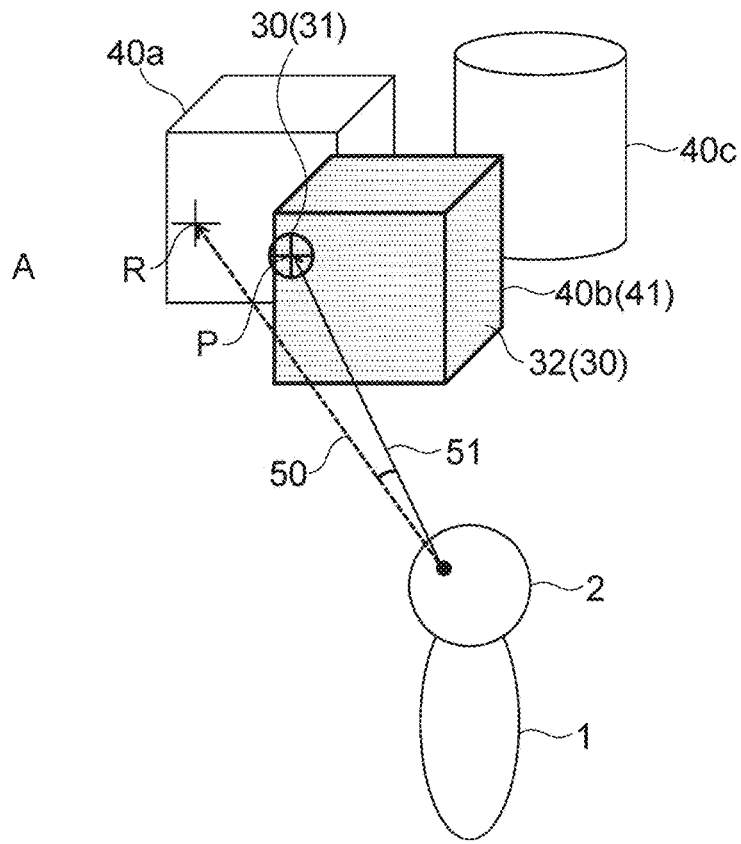
FIG. 4 is a schematic diagram for describing basic behavior of the HMD.
Figure 4:
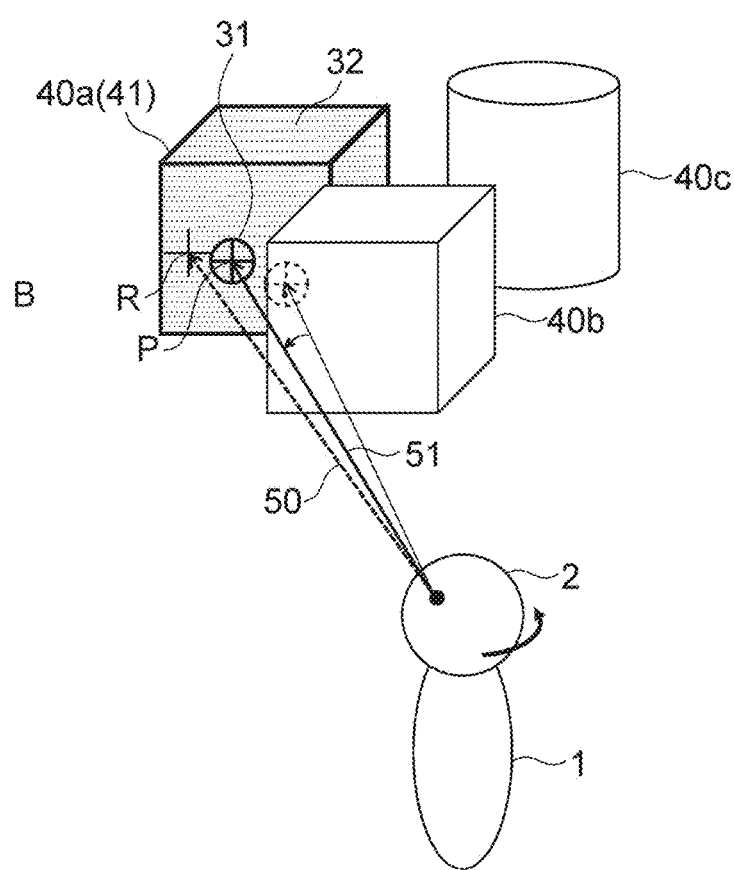

FIG. 4 is a schematic diagram for describing basic behavior of the HMD. FIG. 4A and FIG. 4B schematically illustrate positional relations among a user 1 and three virtual objects 40a to 40c in the first mode and the second mode. In addition, FIG. 4 shows a pointer image 31 and a highlighted image 32 as guide images 32.

As illustrated in FIG. 4A, it is assumed that the user is gazing at the leftmost virtual object 40a in a state where the first mode is performed. FIG. 4A schematically illustrates a dotted arrow that indicates a real sightline vector 50 representing a direction which the user 1 is actually gazing at. An intersection (cross-hair mark in FIG. 4) of the real sightline vector 50 and the virtual object 40a serves as a real gaze point R which the user 1 is actually gazing at. In this case, the virtual object 40a serves as an object that the user intends to select.

In addition, FIG. 4A schematically illustrates a solid arrow that indicates a sightline vector 51 detected by the HMD 100 (sightline detection section 21). The sightline vector 51 has an estimation error (sightline detection error). Therefore, the sightline vector 51 is different from the real sightline vector 50. In the example illustrated in FIG. 4A, the sightline vector 51 intersects with the virtual object 40b that is placed on a front right side of the virtual object 40a which the user 1 is actually gazing at. As a result, a gaze position P based on the sightline vector 51 is detected as a position located on the virtual object 40b, and the virtual object 40b serves as the gaze object 41.

The HMD 100 switches the first mode to the second mode in the case where a predetermined period of time has elapsed in the state where the wrong virtual object 40b is selected as the gaze object 41 as illustrated in FIG. 4A, for example. In this case, the gaze duration of the user 1 serves as the mode switching input. Alternatively, for example, the first mode may be switched to the second mode when the user 1 operates a button such as a game controller. In this case, presence/absence of the operation input provided by using the button serves as the mode switching input.

According to the present embodiment, the display control section 23 corrects the gaze position P on the basis of the head gesture information in the case where the second mode is performed. In other words, in the second mode, it is possible for the user 1 to correct the gaze position P by rotating his/her head. FIG. 4B schematically illustrates an arrow that indicates a rotation direction of a head 2 representing a head gesture made by the user 1 when the user 1 corrects the gaze position P.

For example, in a situation where a gaze position P (pointer image 31) is displayed on a right side of an real gaze position R which the user 1 is actually gazing at, it is considered that the user 1 rotates his/her head 2 to the left in such a manner that the gaze position P moves to the left as illustrated in FIG. 4B. According to the present embodiment, the gaze position P is corrected on the basis of such a head gesture.

Figure 5:
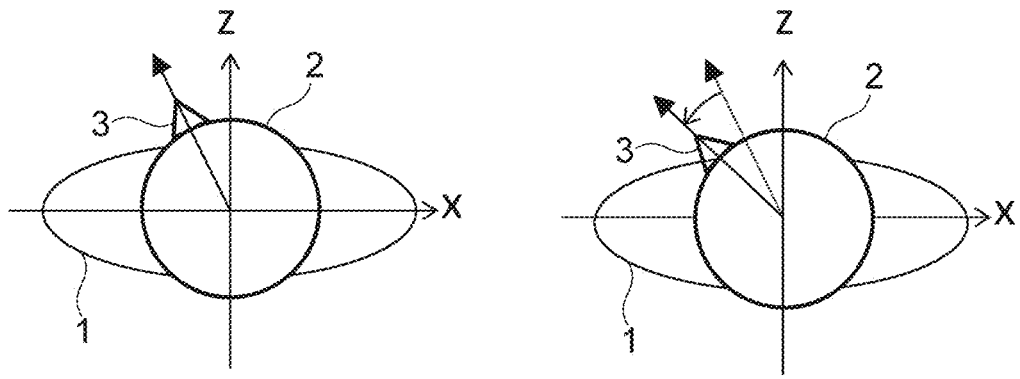
FIG. 5 is a schematic diagram for describing rotation of a head of a user.

FIG. 5 is a schematic diagram for describing rotation of the head of the user 1. A left side and a right side of FIG. 5 schematically illustrate the head 2 of the user 1 obtained by using an overhead view of the user 1 illustrated in FIG. 4B. In FIG. 5, an X-axis direction represents a left-right direction of the user 1, a Y-axis direction represents a direction in a vertical plane perpendicular to the X-axis direction, and a Z-axis direction represents a direction in a horizontal plane perpendicular to the X-axis direction, for example. Note that, it is assumed that a direction that a nose 3 of the user 1 is facing is a front direction of the head 2.

For example, as illustrated on the left side of FIG. 5, it is assumed that the second mode is performed in a state where the user 1 is facing a front left side. The HMD 100 detects a rotation position of the head 2 of the user in this state, and stores the detected rotation position as a reference position. For example, a vector quantity (posture) or the like is appropriately detected as the rotation position. The vector quantity indicates the front direction of the head 2, for example.

In the case where the user 1 makes the head gesture of rotating the head 2 of the user 1 while the second mode is performed, a rotation direction and rotation angle obtained at that time is detected. For example, it is assumed that the user 1 rotates his/her head 2 in such a manner that the user 1 faces a left side of the reference position as illustrated on the right side of FIG. 5. In this case, a direction obtained by rotating the front direction that the nose 3 is facing (counterclockwise direction in FIG. 5) is detected as a rotation direction of the head gesture. In addition, a difference between the rotated front direction and the front direction obtained at the reference position (head difference rotation amount) is detected as a rotation angle of the head gesture.

As described above, the rotation angle of the head 2 of the user 1 is calculated on the basis of a rotation position of the head 2 of the user 1 obtained the second mode is performed. This makes it possible to accurately detect an amount of movement (rotation angle of head gesture) made by the user 1 for correcting the gaze position P (sightline vector 51). As a result, it is possible to accurately correct the sightline vector 51 and the gaze position P.

Note that, in general, humans can rotate their heads 2 while gazing at a same position. Accordingly, it is possible for the user 1 to make the head gesture for correcting the gaze position P while gazing at a target (virtual object 40a) in which the user is interested.

As illustrated in FIG. 4B, the display control section 23 deflects the sightline vector 51 to a similar direction to the rotation direction of the detected head gesture. In other words, the display control section 23 rotates the sightline vector 51 in the rotation direction of the head of the user 1. This makes it possible to move the gaze position P to the left as illustrated in FIG. 4B. As described above, it is possible for the user 1 to intuitively designate the correction direction of the gaze position P (sightline vector 51) by rotating the sightline vector 51, and it is possible to easily correct the sightline vector 51 and the gaze position P.

In addition, an amount of deflection of the sightline vector 51, that is, the rotation angle of the sightline vector 51 is appropriately adjusted according to the rotation angle of the head gesture in such a manner that the rotation angle of the sightline vector 51 falls within a certain range. Details thereof will be described later. As described above, the display control section 23 corrects the gaze position P by correcting the sightline vector 51 on the basis of the head gesture information.

In addition, a guide image 30 (pointer image 31 and highlighted image 32) showing the corrected gaze position P is generated and displayed on the display 15. As a result, the pointer image 31 is moved to a position on the left virtual object 40a as illustrated in FIG. 4B. In addition, the highlighted image 32 in which the virtual object 40a is emphasized is displayed as the gaze object 41. As described above, the display control section 23 controls the display 15 in such a manner that the display 15 displays the guide image 30 including the corrected gaze position P in the case where the second mode is performed.

As described above, in the second mode, the sightline vector 51 detected by the HMD 100 is adjusted on the basis of rotation of the head 2 of the user 1. In other words, it can be said that the second mode is a head adjustment mode of adjusting the sightline vector 51 on the basis of the head 2. This makes it possible to easily select the object desired by the user 1. For example, as illustrated in FIG. 4A and FIG. 4B, it is possible to easily select a desired target from among virtual objects 40 or the like, which are adjacent to each other. This makes it possible to improve operability of making a selection through gaze.

Figure 6:
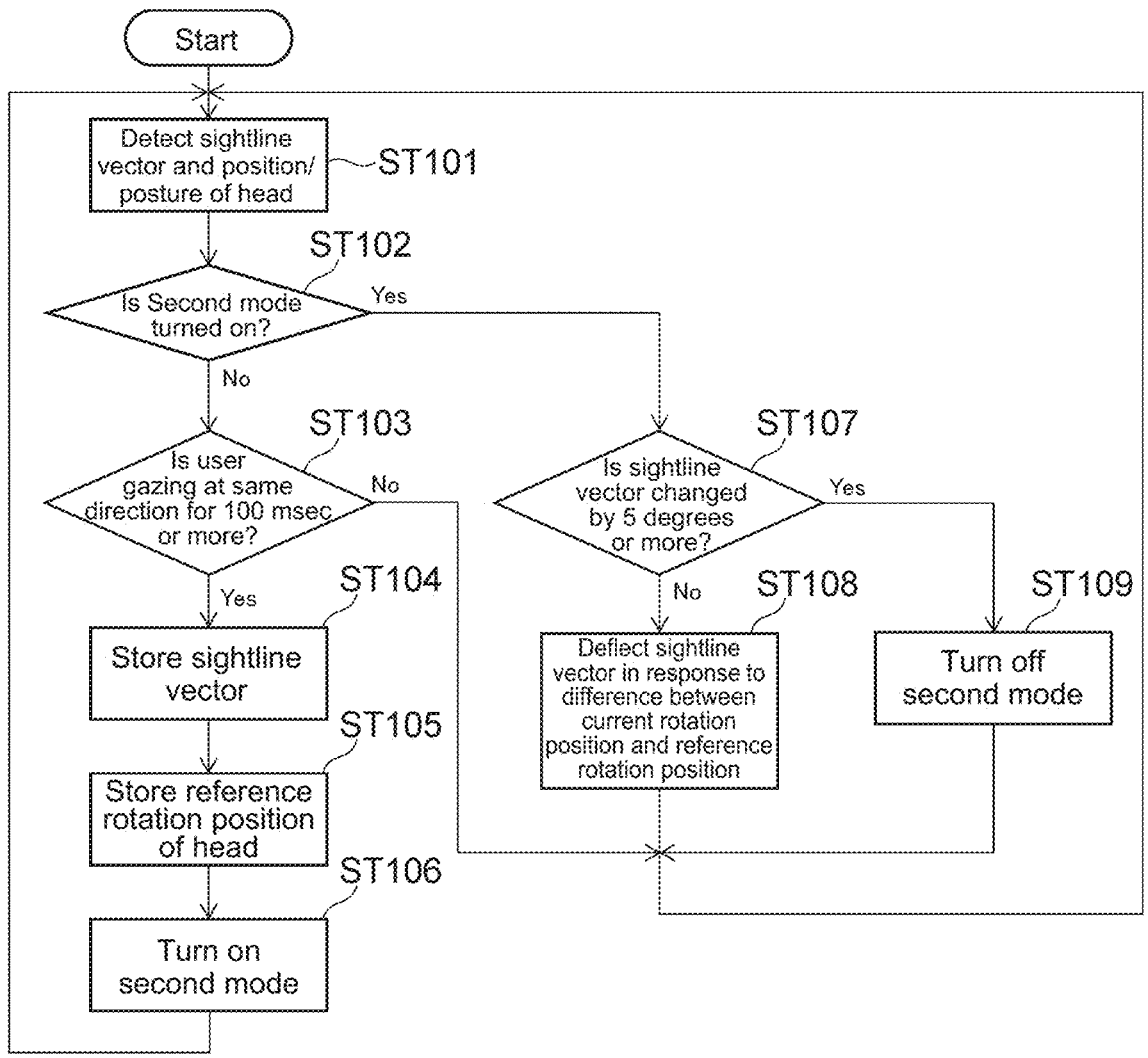
FIG. 6 is a flowchart illustrating an example of a correction process of a sightline vector.
Figure 7:
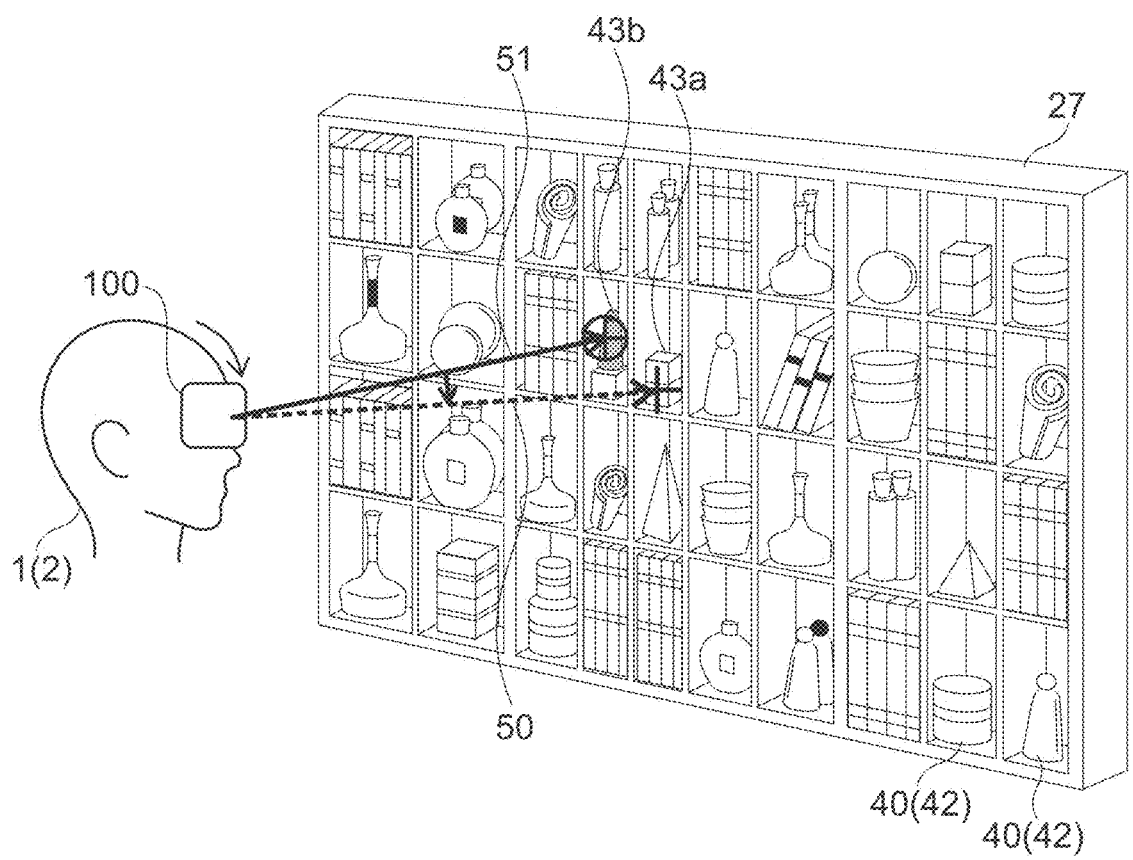
FIG. 7 is a schematic diagram illustrating an example of the correction process of a sightline vector.

FIG. 6 is a flowchart illustrating an example of the correction process of a sightline vector 51. FIG. 7 is a schematic diagram illustrating an example of the correction process of the sightline vector 51. Hereinafter, details of the correction process of the sightline vector 51 (correction process of gaze position P) will be described with reference to FIG. 6 and FIG. 7.

FIG. 7 schematically illustrates an example of the content image 27 for selecting an item. In the example illustrated in FIG. 7, a selection operation is performed to select a desired item from among a plurality of items (virtual objects 40) placed on a shelf. The content image 27 is an example of a screen subject to the selection operation using gaze. Note that, FIG. 7 illustrates a state where an item 43b is selected. The item 43b is different from an item 43a which the user 1 is gazing at.

The process illustrated in FIG. 6 is loop processing to be executed when content starts. First, a sightline vector 51 and a position and posture (rotation position) of the head 2 are detected (Step 101). For example, the sightline detection section 21 loads position and posture information of the eyeballs (eyeball image of the user 1) from the internal-facing camera 12, and detects the sightline vector 51. In addition, the head position and posture detection section 22 loads a detection result of the behavior sensor 13 (head gesture information), and detects the position and posture of the head 2.

It is determined whether or not the second mode is performed (turned on) (Step 102). For example, in the case where the second mode is turned off (No in Step 102), the mode switching section 24 executes a process of determining an initiation condition of the second mode.

In the example illustrated in FIG. 6, it is determined whether or not the user 1 is gazing at a same direction for 100 msec or more. Here, for example, the state where the user 1 is gazing at a same direction means a state where the sightline vector 51 falls within a predetermined angle or less. For example, it is determined that the user 1 is gazing at a same direction for 100 msec or more in the case where an angle between a sightline vector 51 obtained 100 msec ago and a current sightline vector 51 is a predetermined angle (such as 5 degrees) or less.

For example, as illustrated in FIG. 7, the user 1 continuously gazes at the desired item 43a in the case where the user 1 intends to select the item 43a. Therefore, it is considered that a state where the sightline vector 51 hardly moves arises. In this case, the user 1's act of gazing at a same direction serves as the mode switching input provided by the user 1. This allows the user 1 to switch the mode naturally.

Such a time period and angle for determining the sightline vector 51 serve as the initiation conditions of the second mode. As described above, the initiation conditions of the second mode include a condition for an amount of change in the sightline vector 51. Note that, the initiation conditions such as the time period and the angle for determining the sightline vector 51 are not limited. For example, the initiation conditions may be appropriately set depending on an estimation error of the sightline vector 51, a processing speed of the controller 20, or the like.

In addition, for example, a time period where a same object is gazed at may be determined in Step 130. For example, in FIG. 7, the item 43b that is not desired by the user 1 serves as the gaze object 41 while the user 1 is gazing at the item 43a. In this case, for example, it is determined that the initiation condition is satisfied when a time period where the item 43b is selected as the gaze object 41 is a predetermined time period (such as 100 msec, for example).

As described above, the initiation conditions of the second mode include a condition for a time period where the gaze object 41 is gazed at.

In addition, for example, it may be determined whether or not an operation is input by the user 1 through a button or the like in Step 103. In other words, it may be determined that the user 1 has inputted an operation for initiating the second mode. This makes it possible to certainly initiate the second mode. As described above, the initiation conditions of the second mode include the condition for presence/absence of the operation input provided by the user. In addition, the initiation conditions of the second mode are not limited, but may be set appropriately.

Returning to FIG. 6, the processes after Step 101 are executed again in the case where it is determined that the user 1 has not been gazing at the same direction for 100 msec or more, that is, in the case where it is determined that the initiation condition of the second mode is not satisfied (No in Step 103).

In the case where it is determined that the user 1 has been gazing at the same direction for 100 msec or more, that is, in the case where it is determined that the initiation condition of the second mode is satisfied (Yes in Step 103), the sightline vector 51 is stored (Step 104). In addition, when the sightline vector 51 is stored, a reference rotation position of the head is stored (Step 105). Next, the mode switching section 24 turns on the second mode (Step 106).

When the second mode is turned on, Step 101 is executed again, and the sightline vector 51 and the position and posture of the head of the user are detected. In addition, Step 102 is executed, and it is determined whether the second mode is turned on. In the case where the second mode is turned on (Yes in Step 102), the mode switching section 24 executes a process of determining a termination condition of the second mode.

In the example illustrated in FIG. 6, it is determined whether the sightline vector 51 is changed by 5 degrees or more (Step 107) in comparison with the sightline vector 51 stored in Step 104. In other words, it is determined whether or not the angle between the current sightline vector 51 and the sightline vector 51 for stating the second mode is 5 degrees or more.

For example, it is considered that the user 1 turns his/her gaze to an another item 43 in the case where the user 1 has turned his/her interest from the item 43 which the user 1 has been gazing at to the other item 43. Therefore, a process of terminating the second mode is executed in the case where the amount of change in the sightline vector 51 is the certain angle (5 degrees in FIG. 69 or more.

In this case, the user 1's act of gazing at another direction (item) serves as the mode switching input provided by the user 1. In addition, the angle for determining the amount of change in the sightline vector 51 serves as the termination condition of the second mode. As described above, the termination conditions of the second mode include a condition for an amount of change in the sightline vector 51. Note that, the termination conditions such as the angle or the like for determining the amount of change in the sightline vector 51 are not limited.

In addition, for example, a rotation speed (such as angular velocity) of the head of the user 1 may be determined in Step 107. For example, the process of terminating the second mode may be executed in the case where the head rotation speed of the user 1 exceeds a certain speed. This makes it possible to quickly cancel the second mode in the case where the user 1 loses his/her interest in the item 43a which the user 1 has been gazing at. Alternatively, for example, the second mode may be terminated in the case where the user 1 shakes his/her head 2 right and left drastically. In this case, the rotation speed of the head of the user 1 serves as the mode switching input, and the angular velocity or the like for determining the rotation speed serves as the termination condition of the second mode. As described above, the termination conditions of the second mode include a condition for rotation speed of the head 2 of the user 1.

In addition, for example, behavior of the eyes (eye behavior) of the user 1 may be determined in Step 107. For example, the process of terminating the second mode may be executed in the case where the user 1 has his/her eyes closed for a certain period of time or more, or in another case. This makes it possible to easily cancel the second mode. In this case, the user 1's behavior of closing the eyes serves as the mode switching input, and the time period for determining the behavior of closing the eyes serves as the termination condition of the second mode. As described above, the termination conditions of the second mode include the condition for eye behavior of the user 1.

In addition, for example, it may be determined whether or not an operation is input by the user 1 through a button or the like in Step 107. In other words, it may be determined that the user 1 has inputted an operation for terminating the second mode. This makes it possible to certainly terminate the second mode. As described above, the termination conditions of the second mode include the condition for presence/absence of the operation input provided by the user. In addition, the termination conditions of the second mode are not limited, but may be set appropriately.

Returning to FIG. 6, a process of correcting the sightline vector 51 is executed (Step 108) in the case where it is determined that the sightline vector 51 has not changed by 5 degrees or more after the initiation of the second mode, that is, in the case where it is determined that the termination condition of the second mode is not satisfied (No in Step 107).

In the example illustrated in FIG. 6, a process of deflecting the sightline vector 51 according to a difference between the current rotation position and the reference rotation position stored in Step 105 is executed as the process of correcting the sightline vector 51. In other words, the rotation angle of the sightline vector 51 is set according to the rotation angle of the head 5 of the user 1 obtained after the second mode is initiated.

In addition, for example, the process of correcting the sightline vector 51 is a process of correcting the current sightline vector 51. In other words, in Step 108, the process of correcting the sightline vector 51 detected in the last Step 101 is executed. Hereinafter, details of the process of correcting the sightline vector 51 will be described.

Figure 8:
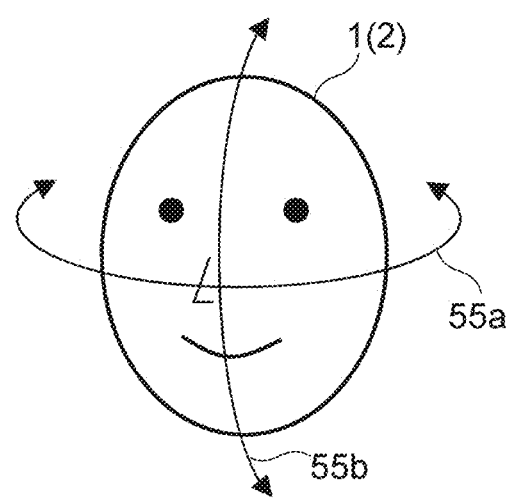
FIG. 8 is a schematic diagram illustrating a head rotation direction to be used for correcting a sightline vector.

FIG. 8 is a schematic diagram illustrating a rotation direction of the head 2 to be used for correcting the sightline vector 51. FIG. 8 schematically illustrates a rotation direction 55a of the head 2 in the horizontal direction (left-right direction) and a rotation direction 55b of the head 2 in the vertical direction (up-down direction), on the basis of a situation where the user 1 is facing the front direction. According to the present embodiment, a maximum adjustment range is set with regard to the rotation angle of the head 2 to be used for correcting the sightline vector 51. For example, the maximum adjustment range is set as an angular range from the reference rotation position. According to the present embodiment, the maximum adjustment range corresponds to a second range.

In general, rotation in the up-down direction is larger than rotation in the left-right direction, with regard to a range capable of rotating the head 2 while the human is gazing at a certain point. For example, the maximum adjustment range is set depending on such a feature. For example, a maximum adjustment range of the rotation direction 55a in the horizontal direction is set to a range of plus or minus 7 degrees from the reference rotation position. In addition, for example, a maximum adjustment range of the rotation direction 55b in the vertical direction is set to a range of plus or minus 3 degrees from the reference rotation position.

Figure 9:
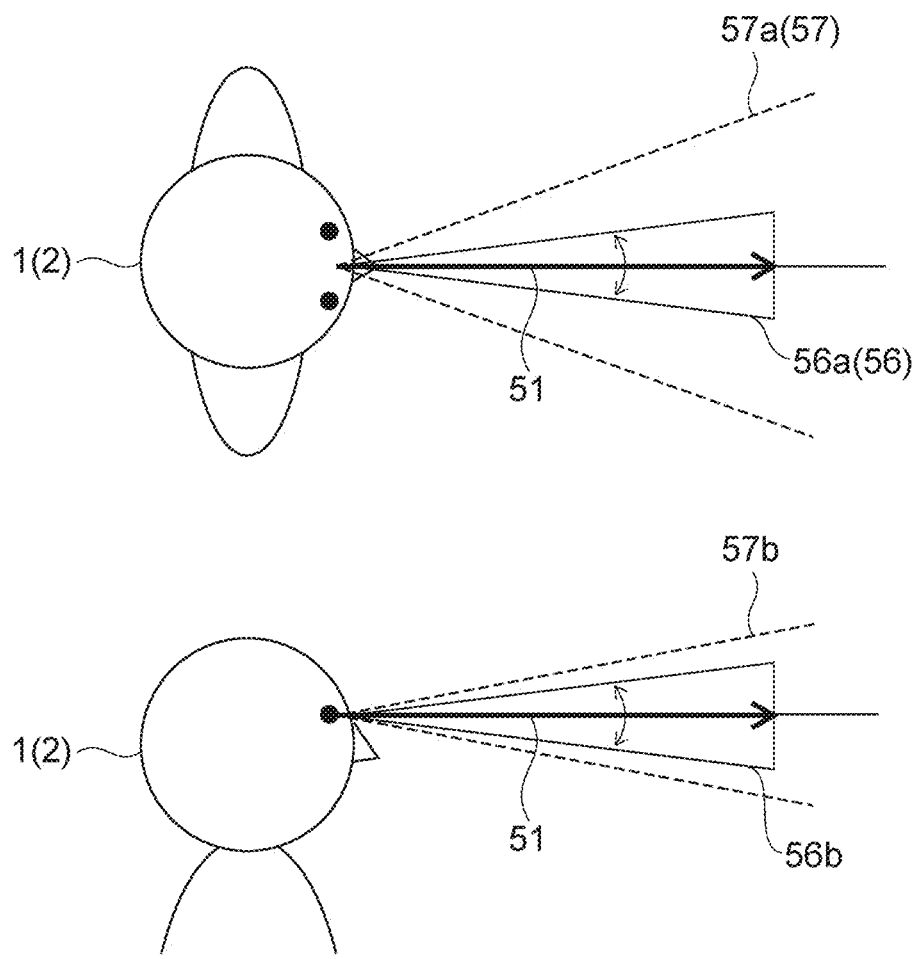
FIG. 9 is a schematic diagram illustrating an example of a maximum rotation range of the sightline vector.

FIG. 9 is a schematic diagram illustrating an example of the maximum rotation ranges of the sightline vector 51. FIG. 9A is a schematic diagram illustrating a maximum rotation range 56a of the sightline vector 51 in the horizontal direction, and FIG. 9B is a schematic diagram illustrating a maximum rotation range 56b of the sightline vector 51 in the vertical direction. In addition, solid arrows indicate the current sightline vector 51.

The maximum rotation range of the sightline vector 51 is a maximum rotation range to be used for correcting the sightline vector 51. In the example illustrated in FIG. 9A and FIG. 9B, both the maximum rotation range 56a in the horizontal direction and the maximum rotation range 56b in the vertical direction are set to a range of plus or minus 2 degree.

The display control section 23 (sightline direction adjustment section 25) sets the rotation angle of the sightline vector 51 according to the rotation angle of the head 2, within the maximum rotation range 56. As described above, the display control section 23 sets the rotation angle of the sightline vector 51 according to the rotation angle of the head 2 of the user 1, in such a manner that the rotation angle of the sightline vector 51 falls within the maximum rotation range 56. According to the present embodiment, the maximum rotation range 56 corresponds to a first range.

For example, the rotation angle of the sightline vector 51 is set in such a manner that the rotation angle of the sightline vector 51 is proportional to the rotation angle of the head 2. For example, in FIG. 9A, it is assumed that a maximum adjustment range 57a of the rotation of the head 2 in the horizontal direction is a range of plus or minus 7 degrees (see dotted lines in FIG. 9A). In this case, for example, the rotation angle (amount of adjustment) of the sightline vector 51 is changed from 0 degrees to 2 degrees proportionately when the rotation angle of the head 2 is rotated from 0 degrees to 7 degrees.

In addition, in FIG. 9B, it is assumed that a maximum adjustment range 57b of the rotation of the head 2 in the vertical direction is a range of plus or minus 3 degrees (see dotted lines in FIG. 9B). In this case, for example, the rotation angle (amount of adjustment) of the sightline vector 51 is changed from 0 degrees to 2 degrees proportionately when the rotation angle of the head 2 is rotated from 0 degrees to 3 degrees. As described above, a coefficient of proportionality between the rotation angle of the sightline vector 51 and the rotation angle of the head 2 is set in such a manner that the coefficient varies depending on the rotation direction.

Note that, a dead zone may be set with regard to the maximum adjustment range 57. For example, a process of preventing correction of the sightline vector 51 or another process is executed in the case where the rotation angle of the head 2 is sufficiently small. For example, it is possible to configure such a setting.

In addition, it is assumed that the rotation angle of the head 2 of the user 1 in the horizontal direction exceeds the range of plus or minus 7 degrees. In this case, the rotation angle of the sightline vector 51 is limited to a range of plus or minus 2 degrees from a maximum value of the maximum rotation range of the sightline vector 51. In other words, a rotation angle exceeding the range of plus or minus 7 degrees in the horizontal direction is not reflected in correction of the sightline vector 51. In a similar way, in the case where a rotation angle exceeds the range of plus or minus 3 degrees in the vertical direction, the rotation angle of the sightline vector 51 is limited to a range of plus or minus 2 degrees from a maximum value of the maximum rotation range 56*b*.

As described above, the display control section 23 sets the rotation angle of the sightline vector 51 to a maximum angle in the maximum rotation range 56 in the case where the rotation angle of the head 2 of the user 1 exceeds the maximum adjustment range 57. This makes it possible to prevent the user 1 from correcting the sightline vector 51 in an uncomfortable posture, for example.

A method of setting the maximum adjustment range 57 of the head 2 of the user 1 is not limited. For example, the maximum adjustment range 57 of the head 2 may be dynamically set depending on a status of progress of content, the posture of the user 1, or the like.

For example, the maximum adjustment range 57 of the head 2 may be set on the basis of a posture of the head 2 of the user 1 when the second mode is performed. For example, it can be considered that the user rotates his/her head 2 to the left or right and gazes at the content image such as the shelf illustrated in FIG. 7, from an angle. In this case, the head 2 is rotated in the horizontal direction. Therefore, it is easier to rotate the head 2 to a front side of a body of the user, than to rotate the head 2 in an opposite direction from the front side of the body.

In the case where such a posture (reference rotation position) of the head 2 is detected in the second mode, a process of setting a maximum rotation range 56 in a rotation direction toward the front side to a wide range and setting a maximum rotation range 56 in the opposite direction to a small range may be executed. In other words, the maximum rotation range 56 is set in such a manner that the maximum rotation range 56 is asymmetric with respect to the reference rotation position. This makes it possible to finely adjust the sightline vector 51 in the direction capable of easily rotating the head 2.

In addition, for example, the maximum adjustment range 57 of the head 2 may be set on the basis of density of candidate objects 42 serving as candidates for the gaze object 41. For example, in the case of a screen showing a lot of the candidate objects 42 (items 43) as illustrated in FIG. 7, the maximum adjustment range 57 is set to a wide range in such a manner that the sightline vector 51 can be finely adjusted. This makes it possible to easily perform a fine selection operation.

In addition, for example, the maximum adjustment range 57 of the head 2 may be set on the basis of estimation accuracy of the sightline vector 51. For example, in the case where the estimation accuracy is low, the maximum adjustment range 57 is set to a wide range. In the case where the estimation accuracy is high, the maximum adjustment range is set to a small range. This makes it possible to perform a selection operation with appropriate sensitivity depending on the estimation accuracy. For example, it is possible to configure such a setting.

In addition, for example, the maximum adjustment range 57 of the head 2 may be set on the basis of calibration data of the sightline vector 51. For example, the calibration data of the sightline vector 51 is data obtained when calibrating the sightline vector 51 of the user who is wearing the HMD 100. For example, the calibration data includes record of postures of the eyeballs or the like obtained at the time of calibration.

For example, sometimes low accuracy is obtained with regard to a sightline vector 51 estimated in a state where positions of the eyeballs exceed the range of the postures of the eyeballs recorded on the calibration data. For example, the maximum adjustment range 57 of the head 2 is appropriately set in such a manner that the postures of the eyeballs do not exceeds the range of the postures of the eyeballs recorded on the calibration data, in the case where the head 2 is rotated while the user 1 is gazing at a certain point. This makes it possible to adjust the sightline vector 51 while maintaining the estimation accuracy.

In addition, a method of setting the maximum rotation range 56 of the sightline vector 51 is not limited. For example, in a way similar to the maximum adjustment range 57 of the head 2, the maximum rotation range 56 may be dynamically set depending on a status of progress of content, the posture of the user 1, or the like.

For example, the maximum rotation range 56 of the sightline vector 51 may be set on the basis of the density of the candidate objects 42. For example, in the case where the candidate objects 42 are densely gathered, the maximum rotation range 56 is set to a small range in such a manner that the sightline vector 51 can be finely adjusted. In addition, in the case where there are sparse candidate objects 42, the maximum rotation range 56 is set to a wide range.

In addition, for example, the maximum rotation range 56 of the sightline vector 51 may be set on the basis of the estimation accuracy of the sightline vector 51. For example, in the case where the estimation accuracy is low, the maximum adjustment range 57 is set to a wide range. In the case where the estimation accuracy is high, the maximum adjustment range 57 is set to a small range. This makes it possible to perform a selection operation with appropriate sensitivity depending on the estimation accuracy. For example, it is possible to configure such a setting.

Returning to FIG. 6, the display control section 23 (image processing section 26) corrects the gaze position P on the basis of a corrected sightline vector 51 when the sightline vector 51 is corrected in Step 108. Next, a pointer image 31 and a highlighted image 32 are generated depending on the corrected gaze position P, and are displayed on the display 15. As described above, the display control section 23 controls the display 15 in such a manner that the display 15 displays the guide image 30 including the gaze position P that is corrected according to rotation of the head 2 of the user 1, in the case where the second mode is performed. For example, when the highlighted image 32 is displayed, it is possible for the user 1 to visually recognize that the desired item 43 is selected.

Note that, the mode switching section 24 turns off the second mode and initiates the first mode in the case where it is determined that the sightline vector 51 is changed by 5 degrees or more after the initiation of the second mode, that is, in the case where it is determined that the termination condition of the second mode is satisfied (Yes in Step 107). When the second mode is turned off, the processes in Step 101 and subsequent steps are executed again.

Figure 10:
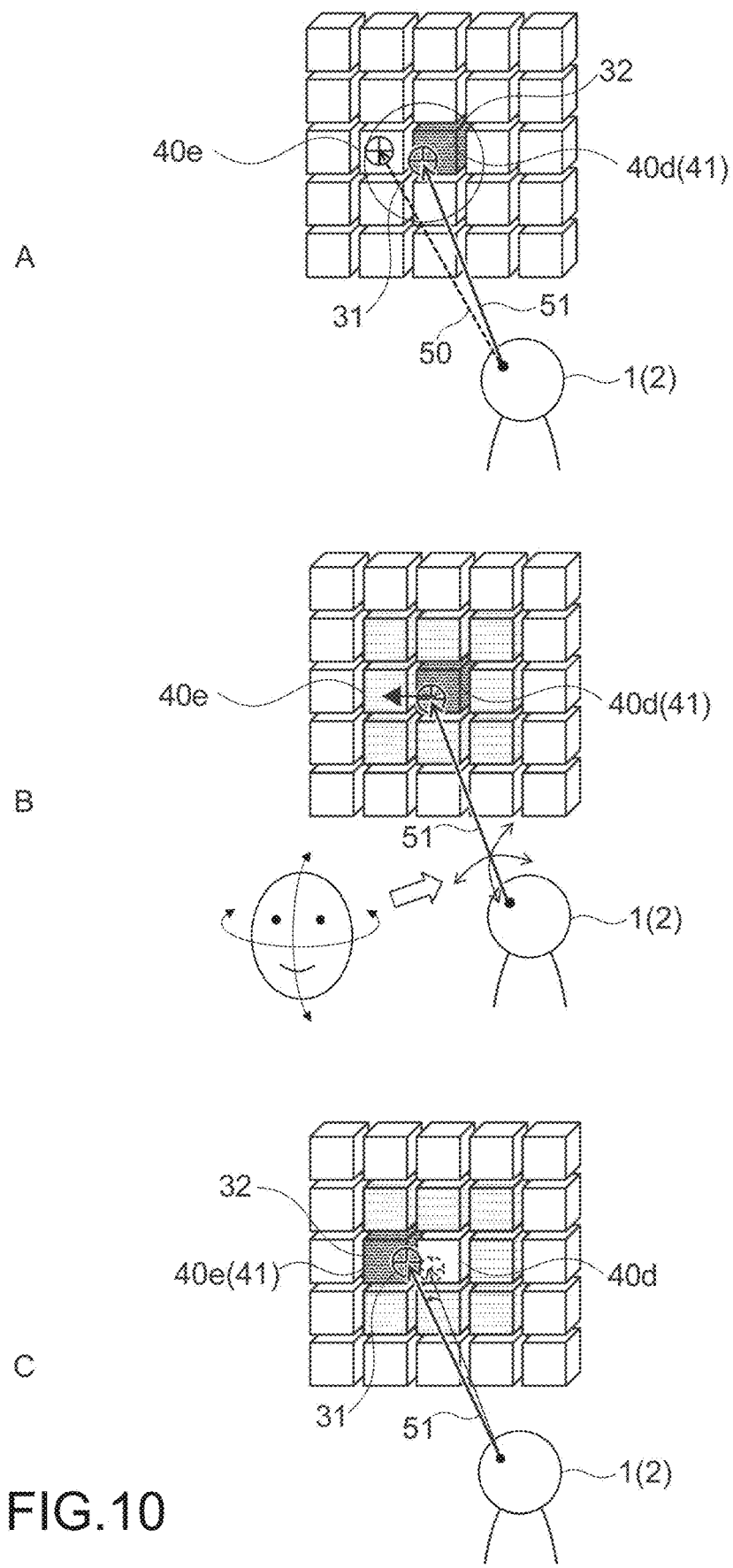
FIG. 10 is a schematic diagram illustrating another example of the process of correcting a sightline vector.

FIG. 10 is a schematic diagram illustrating another example of the process of correcting a sightline vector 51. In the example illustrated in FIG. 10, the sightline vector 51 is corrected in such a manner that the sightline vector 51 continuously rotates in a rotation direction of the head 2 of the user 1.

FIG. 10A and FIG. 10B illustrate 25 virtual objects 40 (cubes) arranged in 5 rows and 5 columns. Among the virtual objects 40, a virtual object 40e on an immediate left side of a central virtual object 40d serves as a virtual object 40 which the user 1 is actually gazing at. In other words, a real sightline vector 50 (dotted arrow in FIG. 10A) indicating the actual sightline direction of the user 1 is directed to the virtual object 40e.

FIG. 10A schematically illustrates the user 1 who is gazing at the virtual object 40e in the first mode. Note that, the sightline vector 51 (solid arrow in FIG. 10A) estimated by the HMD 100 is directed to the central virtual object 40d. Therefore, a gaze position P is detected as a position located on the central virtual object 40d, and the virtual object 40d is selected as a gaze object 41.

As described above, it is possible for the user to narrow down the virtual object 40 which the user 1 is actually gazing at, in the state where the adjacent virtual objects 40 are arranged. In other words, by correcting the sightline vector 51, it is possible to predict candidates for a selection target in advance. The selection target can be potentially selected by the user 1. In the first mode, for example, the image processing section 26 calculates a candidate region (a circle in FIG. 10A) including a current sightline vector 51, which is changed within a predetermined angular range. The predetermined angular range is appropriately set depending on estimation accuracy or the like of the sightline vector 51, for example.

As illustrated in FIG. 10B, the candidates for the selection target are narrowed down when the second mode is executed. For example, the display control section 23 (image processing section 26) detects the virtual objects 40 included in the candidate region calculated as illustrated in FIG. 10A, as an object group serving as candidates for the selection target. In the example illustrated in FIG. 10B, nine virtual objects 40 surrounding the central virtual object 40d serve as the candidates for the selection target.

In addition, in the case where the second mode is performed, a rotation direction of a head gesture when the user rotates his/her head 2 is detected. Next, the sightline vector 51 is corrected in such a manner that the sightline vector 51 continuously rotates in a rotation direction of the head 2, that is, in such a manner that the sightline vector 51 moves inertially. In the example illustrated in FIG. 10B, for example, the head 2 of the user 1 is rotated to the left in FIG. 10B. In this case, the display control section 23 continuously changes the sightline vector 51 in such a manner that the sightline vector 51 shifts to the left. Note that, in this process, a rotation angle of the sightline vector 51 is not set.

In addition, a gaze position P also continuously moves to the left in tandem with the movement of the sightline vector 51. In other words, it can be said that the head gesture of the user 1 is a gesture of designating the movement direction of the gaze position P. As described above, the display control section 23 continuously moves the gaze position by continuously rotating the sightline vector 51 in the rotation direction of the head 2 of the user 1 regardless of the rotation angle of the head 2 of the user 1.

The continuously moving gaze position P moves toward the object group serving as the selection targets. For example, as illustrated in FIG. 10C, the gaze position P reaches the virtual object 40e positioned on the immediate left side of the virtual object 40d. As a result, the virtual object 40e which the user 1 is actually gazing at is selected as the gaze object 41. In other words, the selected object is switched to a virtual object 40 that the gaze position P has reached for the first time after the angle of the sightline vector 51 has been changed.

Note that, the rotation of the sightline vector 51 (movement of the gaze position P) is stopped when the selected object is switched. As described above, with reference to FIG. 10, it can also be said that the gaze position P is moved in the same direction as the rotation direction of the head 2, and sorption behavior is caused. The sorption behavior is behavior of attaching the gaze position P to a candidate for the selection target.

For example, the virtual object 40e, which is switched to the gaze object 41, is displayed as a highlighted image 32 (guide image 30). In other words, the display control section 23 controls the display 15 in such a manner that the display 15 displays the guide image 30 in which the gaze object 41 is switched according to the continuously moving gaze position P.

As described above, by continuously moving the gaze position P, it is possible to correct the gaze position P without designating the amount of movement of the gaze position P or the like. Therefore, it is possible to easily select a desired virtual object 40 without designating a movement distance or the like in the case where the virtual objects 40 or the like are densely displayed, for example. Alternatively, even in the case where the virtual objects 40 or the like are separately displayed, it is possible to guide the gaze position P to a desired position only by rotating the head 2 and designating a movement direction of the gaze position P.

Figure 11:
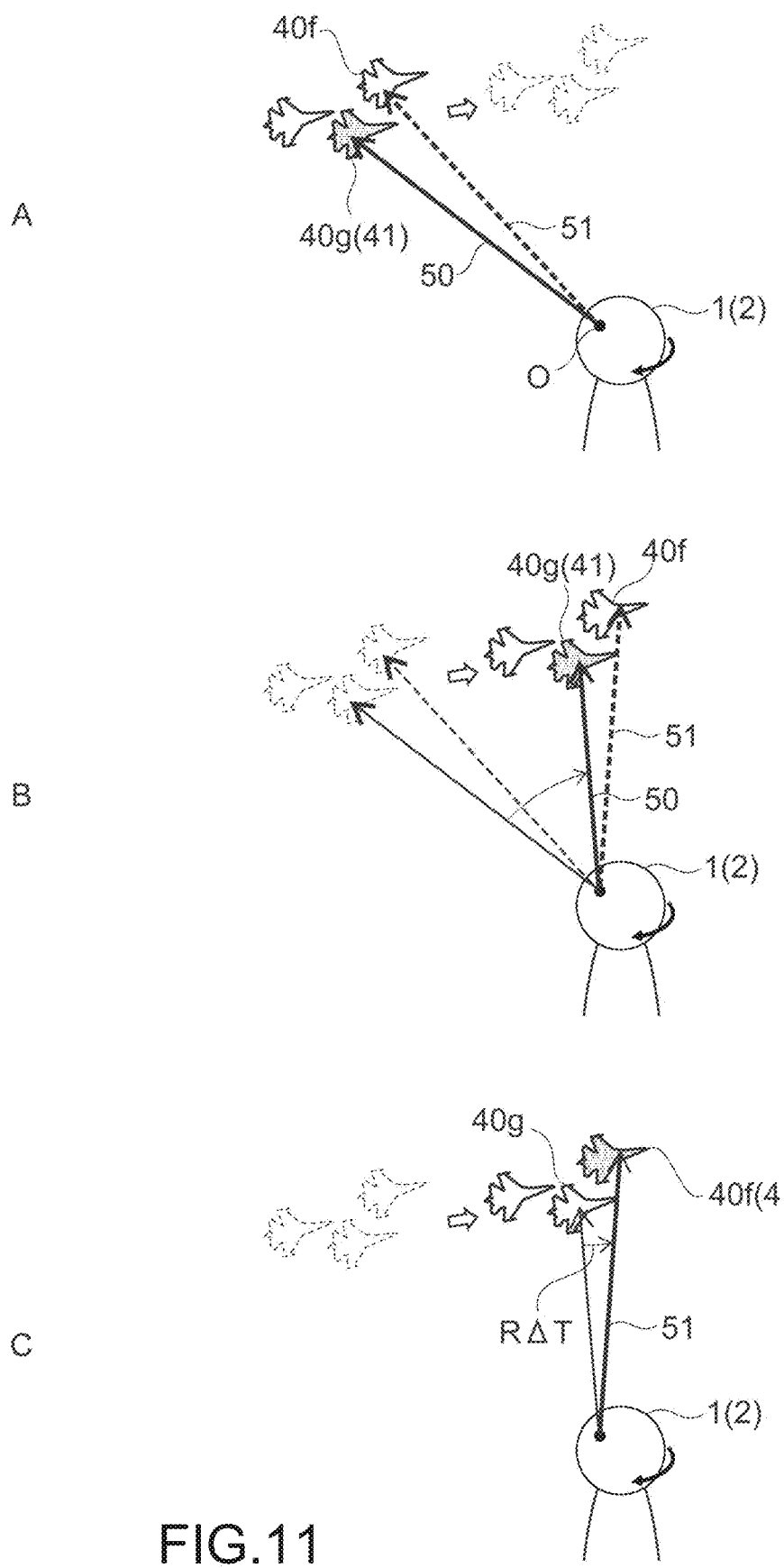
FIG. 11 is a schematic diagram illustrating another example of the correction process of a sightline vector.

FIG. 11 is a schematic diagram illustrating another example of the correction process of a sightline vector. In the example illustrated in FIG. 11, a sightline vector 51 of the user 1 is corrected with regard to a plurality of virtual objects 40 that are moving.

FIG. 11A and FIG. 11B schematically illustrate three virtual objects 40 (airplanes) that are moving to the right in FIG. 11A and FIG. 11B. Among the virtual objects 40, a leading virtual object 40f positioned on the right side in a movement direction serves as a virtual object 40 which the user 1 is actually gazing at. In other words, a real sightline vector 50 (dotted arrow in FIG. 11A and FIG. 11B) indicating an actual sightline direction of the user 1 is directed to the leading virtual object 40f.

FIG. 11A schematically illustrates the user 1 who is gazing at the virtual object 40f in the first mode. Note that, the sightline vector 51 (solid arrow in FIG. 11A and FIG. 11B) estimated by the HMD 100 is directed to a virtual object 40g positioned behind the leading virtual object 40f. Therefore, a gaze position P is detected as a position located on the virtual object 40g, and the virtual object 40g is selected as a gaze object 41.

For example, the second mode is initiated in the state illustrated in FIG. 11A. Note that, it is assumed that the virtual objects 40 are moving while the second mode is performed. The user 1 who is gazing at the virtual object 40f rotates his/her head 2 in the right direction in tandem with movement of the virtual object 40f. As a result, the real sightline vector 50 and the sightline vector 51 rotate in tandem with movement of the virtual object 40f as illustrated in FIG. 11B.

The display control section 23 (image processing section 26) calculates a rotation speed of the head 2 of the user 1 rotating in tandem with movement of the respective virtual objects 40. For example, rotational angular velocity ω1 of a vector connecting a viewpoint position O of the user 1 and a position of the gaze object 41 (virtual object 40f) is calculated. Note that, for example, a vector calculated on the basis of the content information or the like, or the sightline vector 51 may be used as the vector connecting the viewpoint position O and the gaze object 41.

In addition, the display control section 23 loads rotational angular velocity ω2 of the head 2 of the user 1. For example, it is assumed that the user 1 rotates his/her head 2 in a direction of correcting the gaze position P (in the right direction in FIG. 11) while gazing at the virtual object 40f. In this case, it is considered that the rotational angular velocity ω2 of the head 2 is higher than the rotational angular velocity ω1 that moves in tandem with movements of the virtual objects 40.

For example, a rotational angular velocity (corrected angular velocity R) is calculated by canceling the movement of the head 2 that moves in tandem with the movements of the virtual objects 40 on the basis of ω1 and ω2. For example, if ω2≥ω1 as illustrated in FIG. 11B, the corrected angular velocity R is calculated by suing an equation listed below.

$$R=\omega 1-\omega 2$$

In addition, the display control section 23 calculates an amount of angular displacement (R·ΔT) of the head 2 by multiplying the corrected angular velocity R by a sampling period ΔT (sec) or the like. The corrected angular velocity R is calculated by using the above-listed equation. The amount of angular displacement is an amount of displacement obtained by canceling the rotation of the head 2 that moves in tandem with the movements of the virtual objects 40. In addition, it can be said that the amount of angular displacement is a relative rotation angle of the head 2 of the user to the moving virtual objects 40.

As described above, the display control section 23 calculates a relative rotation angle of the head of the user to the moving virtual objects 40, on the basis of the rotation speed of the head of the user 1, which moves in tandem with the movements of the virtual objects 40 serving as the candidates for the gaze object 41. For example, by using such a relative rotation angle (amount of angular displacement), it is possible to represent a rotation angle of a head gesture made by the user 1 for correcting the gaze position P (sightline vector 51).

As illustrated in FIG. 11C, the sightline vector 51 is corrected by using the amount of angular displacement R·ΔT as the rotation angle. For example, the sightline vector 51 directed to the virtual object 40g is corrected in such a manner that the sightline vector 51 becomes directed to the leading virtual object 40f. As a result, the gaze position P moves to the virtual object 40f, and the virtual object 40f becomes selected as the gaze object 41. As described above, even in the case where the selection target is moving, it is possible to select the desired target by eliminating the effects of rotation of the head 2 of the user 1 that moves in tandem with the movement of the selection target.

Figure 12:
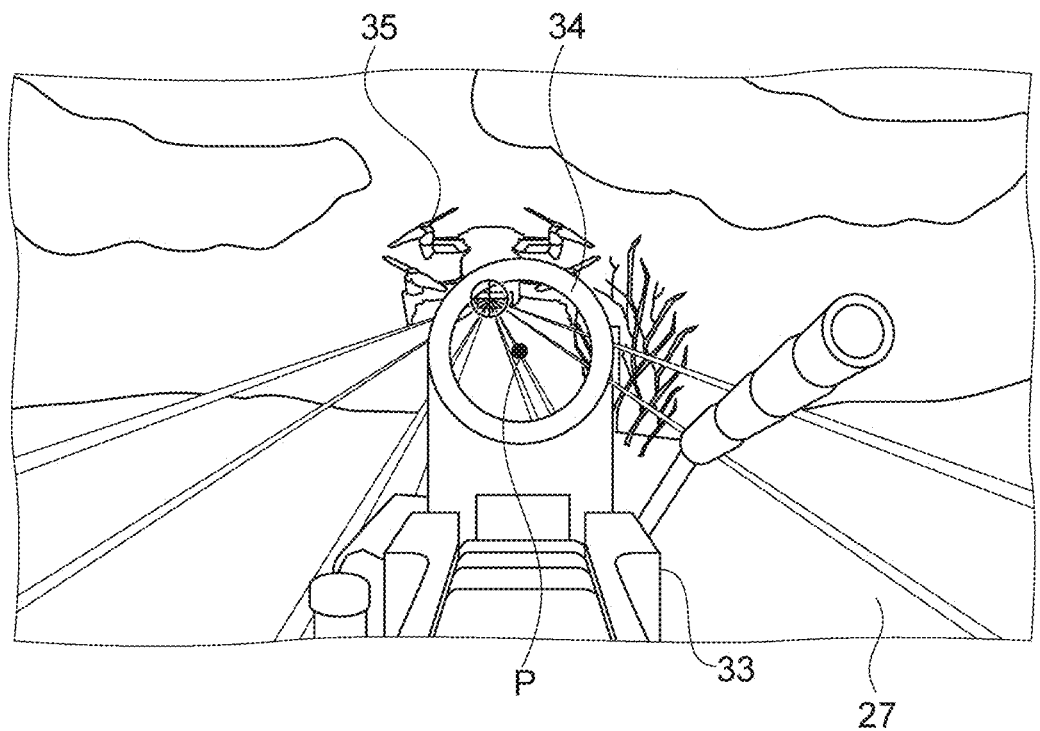
FIG. 12 is a schematic diagram illustrating an example of a screen subject to a selection operation using gaze.
Figure 13:
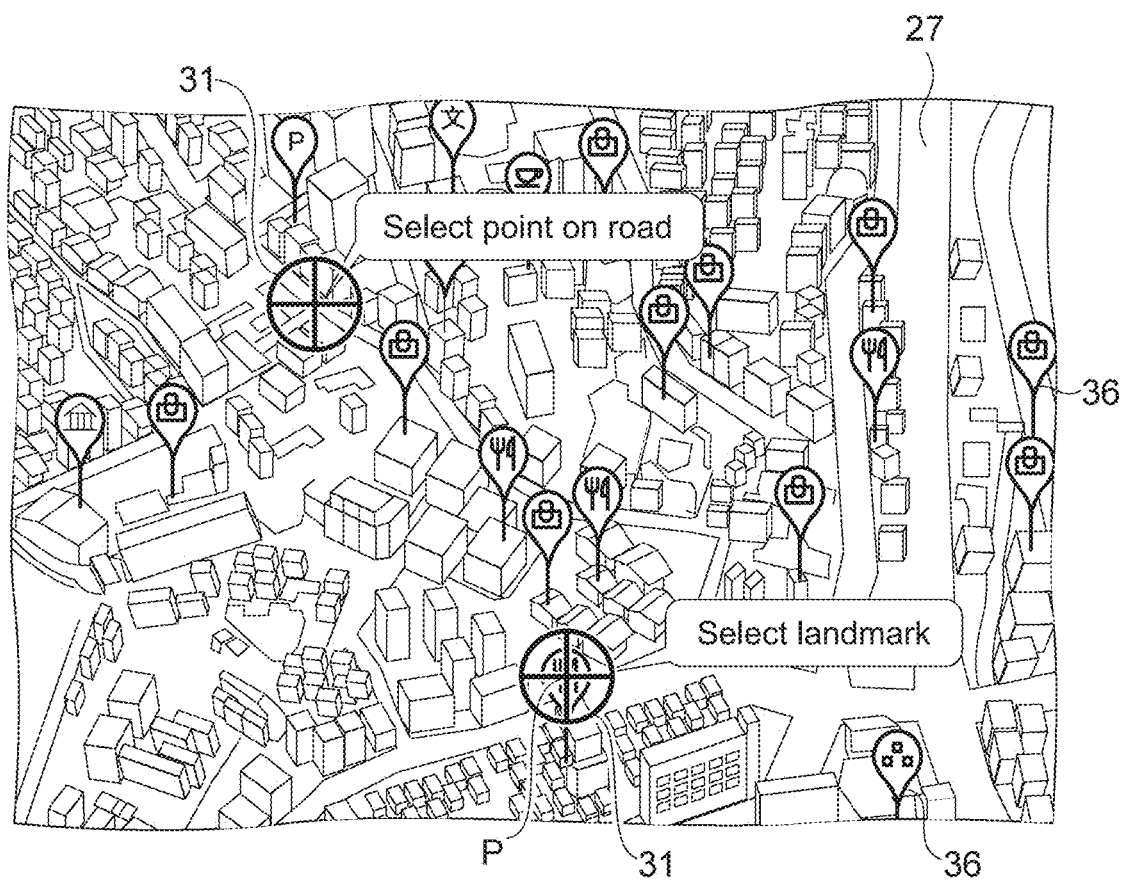
FIG. 13 is a schematic diagram illustrating an example of a screen subject to the selection operation using gaze.
Figure 14:
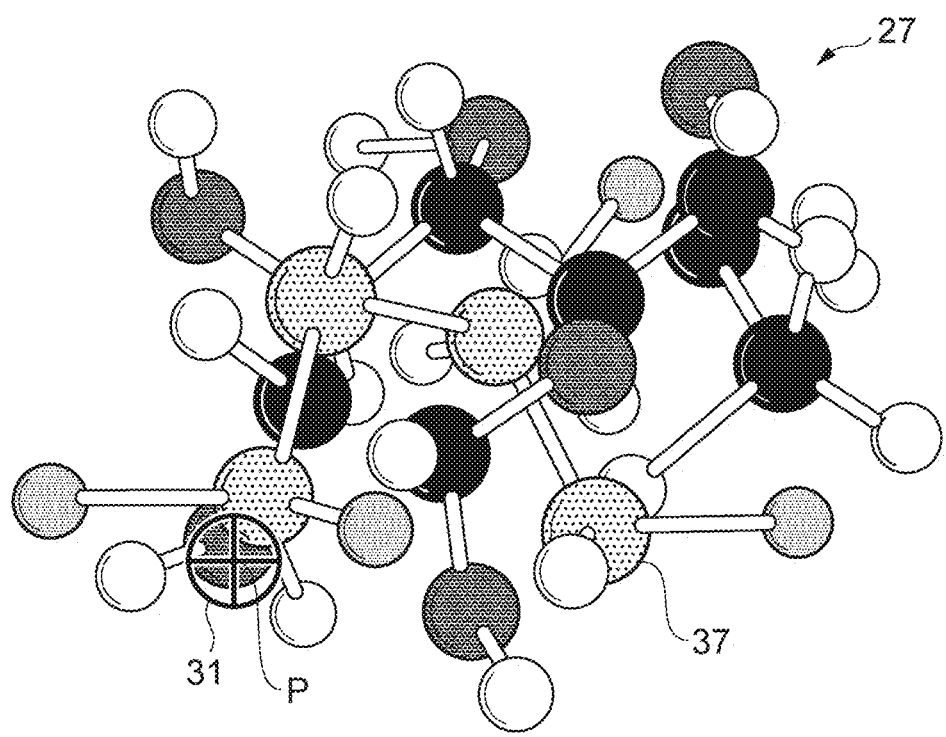
FIG. 14 is a schematic diagram illustrating an example of a screen subject to the selection operation using gaze.

FIG. 12 to FIG. 14 are schematic diagrams, each of which illustrates an example of a screen subject to the selection operation using gaze. FIG. 12 schematically illustrates a content image 27 used in a first-person shooter (FPS) video game. In the example illustrated in FIG. 12, a scope image 33 described with reference to FIG. 3B is used as a guide image 30 showing a gaze position P.

The scope image 33 illustrated in FIG. 12 shows a gun-type virtual object 40 including a sight 34. For example, the scope image 33 is displayed in such a manner that a center of the sight 34 is located at a center of a screen (display 15). In addition, display of the content image 27 is controlled in such a manner that the center of the screen overlaps a gaze position P. Note that, the content image 27 also shows a shooting target 35.

In the example illustrated in FIG. 12, the center of the sight 34 does not overlap the shooting target 35. It is assumed that the user 1 rotates his/her head 2 in a direction where there is the shooting target 35 (an upper left direction in FIG. 12) in the above-described state. In this case, the gaze position P is corrected in such a manner that the gaze position P moves toward the shooting target 35. As a result, the whole content image 27 is corrected in such a manner that the shooting target 35 moves to the center of the screen (gaze position P). As described above, aiming behavior of aiming the sight 34 at the shooting target 35 can be finely adjusted by using the orientation of the head 2. This makes it possible to sufficiently improve operability with regard to the video game content.

FIG. 13 illustrates a content image 27 showing map content of a bird's-eye-view map. As illustrated in FIG. 13, the map content includes virtual objects 40 indicating a lot of landmarks 36, for example. For example, the landmarks 36 are indicated by icons, each of which represents a feature of a position/building serving as the landmark 36 such as shopping, restaurant, school, and parking lot. A landmark 36 desired by the user 1 is selected from among the above-described landmarks 36.

For example, a pointer image 31 indicating a gaze position P is displayed. In the case where the pointer image 31 does not overlap the desired landmark 36, the user rotates his/her head 2. This makes it possible to easily correct the gaze position P (pointer image 31). Accordingly, it is possible to easily select the desired landmark 36 even in the case where a lot of landmarks 36 are densely gathered.

In addition, for example, even in the case where the user 1 intends to select a point on a road such as an intersection, it is considered that sometimes another object such as an adjacent building or landmark 36 is erroneously selected. Even in such a case, it is possible for the user 1 to correct the gaze position P (pointer image 31) by appropriately rotating his/her head 2 while gazing at the map content. In addition, it is possible to easily select the desired point.

FIG. 14 illustrates a content image 27 showing a 3D model. FIG. 14 schematically illustrates a three-dimensional model of a chemical formula consisting of a plurality of atoms 37 (virtual objects 40). For example, the 3D model indicates the virtual objects 40 overlapping each other in a depth direction. For example, in the case where the user 1 intends to select a virtual object 40 (atom 37) displayed in the back, there is a possibility that the gaze position P erroneously selects another virtual object 40 at the front.

In such a case, it is possible for the user 1 to adjust the gaze position P (pointer image 31) in such a manner that the gaze position P moves toward the virtual object 40 displayed in the back, by rotating his/her head 2 in a direction where the virtual object 40 displayed in the back is viewable, for example. As described above, it is possible to easily select the desired target even in the case where the selection target is displayed three-dimensionally.

Figure 15:
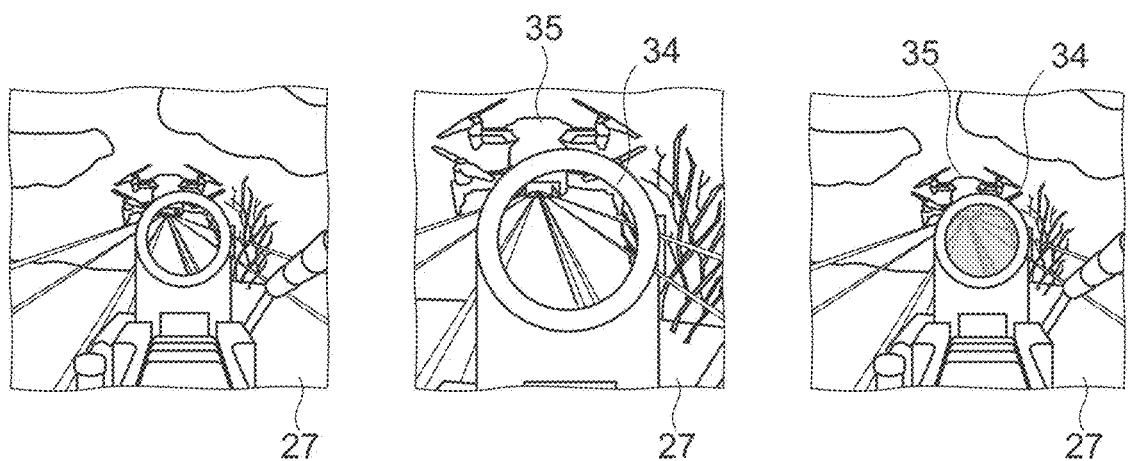
FIG. 15 is a schematic diagram illustrating display examples of a screen in a second mode.

FIG. 15 is a schematic diagram illustrating display examples of a screen in the second mode. An image illustrated on the left side of FIG. 15 is an example of a screen displayed on the display 15 in the case where the first mode is performed. This image is a display example obtained in a mode of not correcting a gaze position P. Note that, the image illustrated on the left side of FIG. 15 illustrates a portion of a content image 27 used in the video game described with reference to FIG. 12.

An image illustrated on the center of FIG. 15 is an example of a screen displayed on the display 15 in the case where the second mode is performed. As illustrated in the central image, the whole screen is magnified (zoomed in) in the case where the second mode is performed and an operation of correcting the gaze position P is initiated, for example. As described above, by displaying a zoomed viewpoint, it is possible to make a detailed observation of a positional relation between the gaze position P and a virtual object 40 (shooting target 35), which the user 1 is actually gazing at, for example. This makes it possible to accurately execute the correction process of the gaze position P by using rotation of the head 2, for example.

An image illustrated on the right side of FIG. 15 is another example of a screen displayed on the display 15 in the case where the second mode is performed. In the example illustrated in the right image, the inner color of the sight 34 is switched to a color different from the color used in the first mode, in the case where the second mode is performed. This makes it possible to clearly indicate that the second mode is initiated. As a result, it is possible to sufficiently prevent making of a gesture for moving the gaze position P in a state where the second mode is not initiated, for example.

Note that, the present technology is not limited to the examples illustrated in FIG. 15. It is also possible to execute a process of appropriately switching display indicating that the second mode is performed, or another process. For example, it is also possible to change the color, size, design, or the like of the pointer image 31 in the case where the second mode is initiated. In addition, for example, it is also possible to perform a process of changing the color of the highlighted image 32, a process of blinking the highlighted image 32, or another process in the case where the second mode is initiated.

The examples of the head gesture have been described above as gestures of correcting the gaze position P (sightline vector 51). The present technology is not limited thereto. For example, it is also possible to detect any gesture that can be made by the user 1 who is wearing the HMD 100, and to execute the process of correcting the gaze position P on the basis of gesture information related to the gesture.

Figure 16:
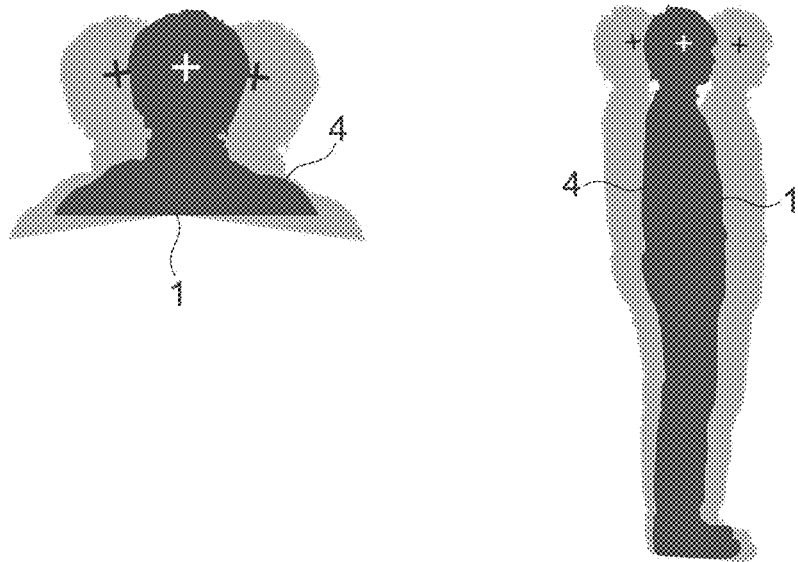
FIG. 16 is a schematic diagram illustrating examples of a body gesture made by the user.

FIG. 16 is a schematic diagram illustrating examples of a body gesture made by the user 1. For example, as the gesture information, it is possible to use information related to a body gesture when the user 1 is tilting his/her upper body 4. FIG. 16 schematically illustrates the body gesture when the user 1 is tilting his/her upper body 4.

An image illustrated on the left side of FIG. 16 is an example of a body gesture when the user 1 is tilting his/her upper body 4 to the left and right. For example, the sightline vector 51 (gaze position P) is adjusted in such a manner that the sightline vector 51 (gaze position P) moves to the left when the user 1 tilts his/her upper body 4 to the left. In addition, for example, the sightline vector 51 (gaze position P) is adjusted in such a manner that the sightline vector 51 (gaze position P) moves to the right when the user 1 tilts his/her upper body 4 to the right. An image illustrated on the right side of FIG. 16 is an example of a body gesture when the user 1 is tilting his/her upper body 4 back and forth. For example, the sightline vector 51 (gaze position P) is adjusted in such a manner that the sightline vector 51 (gaze position P) moves upward when the user 1 tilts his/her upper body 4 back. In addition, for example, the sightline vector 51 (gaze position P) is adjusted in such a manner that the sightline vector 51 (gaze position P) moves downward when the user 1 tilts his/her upper body 4 forth.

As described above, it is possible to correct the sightline vector 51 in such a manner that the sightline vector 51 moves to the left, right, upward, or downward according to the tilt of the upper body 4 to the left, right, back, or forth. Note that, an amount of the adjustment such as a rotation angle of the sightline vector 51 may be appropriately set depending on the magnitude of tilt or the like.

Such a body gesture is detected by the behavior sensor 13 installed in the HMD 100, for example. Alternatively, the body gesture may be detected by using a camera or the like for capturing an image of the user 1 who is wearing the HMD 100, from an outside. In this case, a camera installed on an outside functions as the second sensor.

Figure 17:
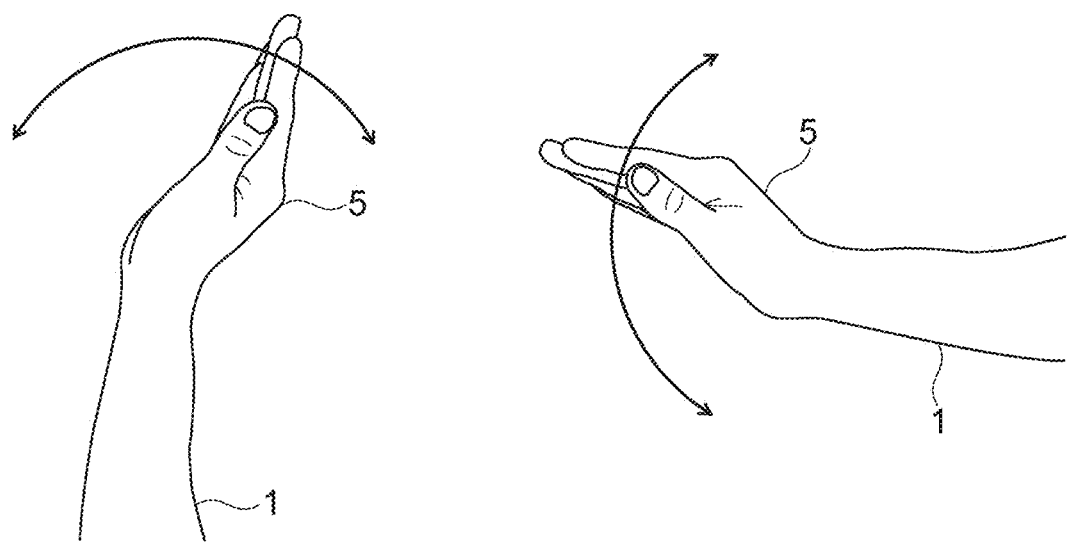
FIG. 17 is a schematic diagram illustrating examples of a hand gesture made by the user.

FIG. 17 is a schematic diagram illustrating examples of a hand gesture made by the user 1. For example, as the gesture information, it is possible to use information related to a hand gesture when the user 1 moves his/her hand 5. FIG. 17 schematically illustrates hand gestures when the user 1 waves his/her hand 5 to the left, right, upward, and downward.

An image illustrated on the left side of FIG. 17 is an example of a hand gesture when the user 1 waves his/her hand 5 to the left and right. For example, the user 1 makes a gesture of waving his/her elbow, wrist, or the like to the left and right in a state where the user 1 is keeping his/her palm in the vertical direction. For example, the sightline vector 51 (gaze position P) is adjusted in such a manner that the sightline vector 51 (gaze position P) moves to the right in the case where the user 1 waves his/her hand 5 to the right. The sightline vector 51 (gaze position P) is adjusted in such a manner that the sightline vector 51 (gaze position P) moves to the left in the case where the user 1 waves his/her hand 5 to the left.

An image illustrated on the right side of FIG. 17 is an example of a hand gesture when the user 1 waves his/her hand 5 upward and downward. For example, the user 1 makes a gesture of waving his/her elbow, wrist, or the like upward and downward in a state where the user 1 is keeping his/her palm in the horizontal direction. For example, the sightline vector 51 (gaze position P) is adjusted in such a manner that the sightline vector 51 (gaze position P) moves upward in the case where the user 1 waves his/her hand 5 upward. The sightline vector 51 (gaze position P) is adjusted in such a manner that the sightline vector 51 (gaze position P) moves downward in the case where the user 1 waves his/her hand 5 downward.

As described above, it is possible to correct the sightline vector 51 in such a manner that the sightline vector 51 moves to the left, right, upward, or downward according to the movement of the hand 5 of the user 1 to the left, right, forward, or downward. Note that, an amount of the adjustment such as a rotation angle of the sightline vector 51 may be appropriately set depending on an amount of movement or the like of the hand 5. Such a body gesture is detected by using the camera or the like for capturing an image of the user 1 who is wearing the HMD 100, from the outside, for example. Alternatively, the user 1's hand gesture of moving his/her hand 5 may be detected on the basis of movement of the game controller or the like held by the user 1 in his/her hand 5.

As described above, the controller 20 according to the present embodiment acquires the position and posture information of the eyeballs of the user 1 and estimates the sightline vector 51 on the basis of the position and posture information of the eyeballs. The display 15 displays the guide image 30 for showing the gaze state based on the sightline vector 51. In addition, the controller 20 switches between the first mode and the second mode according to the mode switching input for switching between the modes related to the guide image 30, the first mode being a mode of reflecting the position and posture information of the eyeballs in the guide image 30, the second mode being a mode of correcting the gaze state on the basis of the gesture information, which is different from the position and posture information of the eyeballs. This makes it possible to improve operability of performing a selection operation through gaze.

Figure 18:
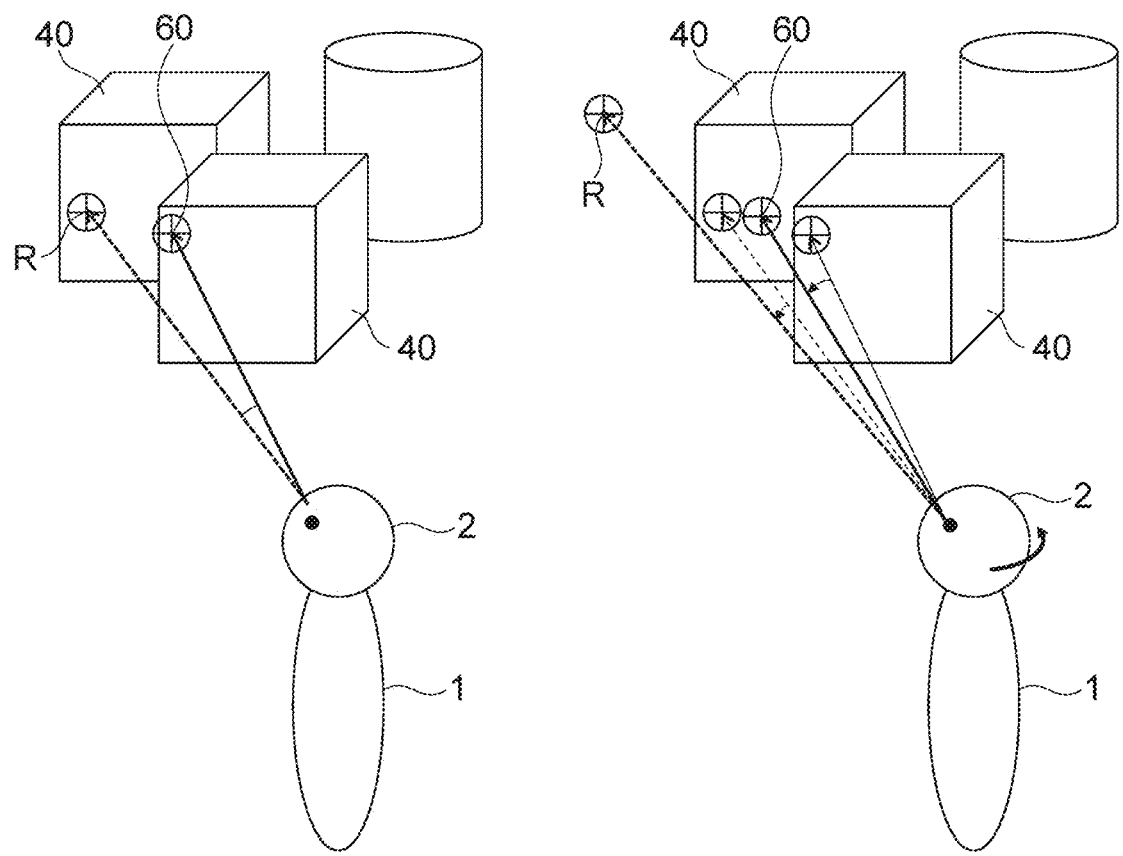
FIG. 18 is a schematic diagram for describing a selection operation using gaze according to a comparative example.

FIG. 18 is a schematic diagram for describing a selection operation using gaze according to a comparative example. As illustrated on the left side of FIG. 18, a gaze point 60 detected by a system may erroneously select a virtual object 40 placed at the front, in a state where the user 1 is gazing at a virtual object 40 placed in the back. In this case, the virtual object 40 that is placed in the back and that the user 1 intends to select is not selected.

For example, it is considered that the user 1 performs behavior of shaking his/her head left and right to move the gaze point 60 while gazing at the virtual object 40 placed in the back. In this case, the original gaze point of the user 1 hardly moves and an error tendency hardly changes even when the user 1 shakes his/her head left and right. Therefore, even when the user 1 performs the behavior of shaking his/her head left and right, the gaze point 60 detected by the system hardly moves, and the state of selecting the virtual object 40 does not change.

In addition, for example, as illustrated on the right side of FIG. 18, it is also possible to consider a method of moving the gaze point 60 on the system side by intentionally displacing the gaze point which the user 1 is actually gazing at. In this case, it is necessary to perform the selection operation while intentionally gazing at a position distant from the virtual object 40 that the user 1 intends to select. On the other hand, it is also necessary to check an amount of adjustment for adjusting the gaze point 60. Accordingly, there is a possibility that it becomes difficult to perform the selection operation itself. As described above, sometimes it becomes difficult to perform the selection operation or the like in the case where the sightline direction, the gaze point, or the like is not corrected.

It is also possible to consider a method of making it easier for the user to visually recognize the virtual object 40 by moving the virtual object 40 itself instead of correcting the gaze direction, the gaze point, or the like. In this case, for example, the virtual object 40 moves depending on the gaze point of the user 1. Therefore, it is easy to perform the selection operation. On the other hand, if content or the like includes objects and it is inappropriate to change arrangement of the objects, there is a possibility that quality of the content itself may deteriorate by moving the virtual object 40.

In the present embodiment, the guide image 30 is generated for showing the gaze position P based on the estimated sightline vector 51 and the gaze state of the gaze object 41 or the like. In addition, the second mode is performed on the basis of the gesture information of the user. The second mode is a mode of correcting the gaze state indicated by the guide image 30. This allows the user 1 to easily adjust the gaze position P and the like in such a manner that the desired target is selected while performing the selection operation.

Therefore, for example, in the case where a wrong virtual object 40 is selected, it is possible to easily change the selected object by performing behavior of rotating the head 2 in a direction where there is a virtual object 40 that the user 1 originally intends to select. In addition, it is also possible to adjust the gaze position P through a gesture. Accordingly, it is not necessary to move the sightline direction to another direction in such a manner that the gaze position P moves. In addition, it is possible to easily select the desired target without executing the process of moving the selection target.

In the present embodiment, the gestures of the head 2 are used as an additional selection operation using gaze. This makes it possible to naturally execute the process of correcting the gaze position P as a portion of the selection operation, and it is possible to drastically improve operability of the selection operation using gaze. In addition, in the present embodiment, the selection operation capable of quickly moving the gaze position P through gaze is compatible with the high-resolution selection operation using the head 2.

As described above, it is possible to perform the high-resolution selection operation. This makes it possible to perform the selection operation through gaze even in a state where object are gathered in a narrow space or in a state where an object is placed far away, for example. Accordingly, it is possible to widen the range of application of the selection operation using gaze, and it is also possible to provide a novel user interface or the like.

In addition, even in the case where the gaze detection accuracy is low, it is possible to build a system or the like capable of easily selecting a desired object by using the present technology. This makes it possible to reduce cost for the gaze detection camera, and to establish a system or the like, which is easily available to everyone without calibration.

Other Embodiments

The present technology is not limited the above-described embodiments. It is possible to achieve various kinds of other embodiments.

Figure 19:
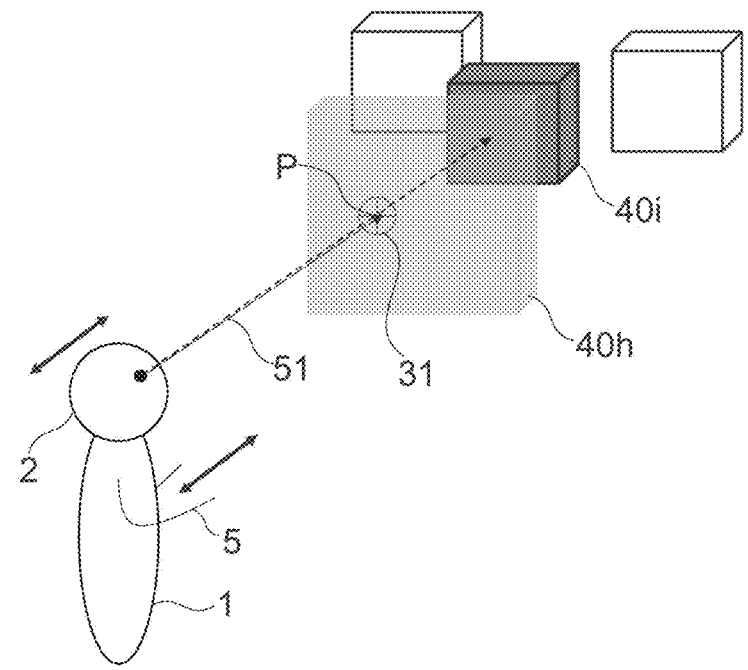
FIG. 19 is a schematic diagram illustrating an example of a correction process of a gaze position according to another embodiment.

FIG. 19 is a schematic diagram illustrating an example of a correction process of a gaze position P according to another embodiment. In the example illustrated in FIG. 9, a location of the gaze position P in a depth direction (front-back direction) is corrected. In FIG. 19, other virtual objects 40 are placed behind a translucent virtual object 40*h*. In addition, it is assumed that the user 1 intends to select a virtual object 40*i* placed behind the translucent virtual object 40*h*.

For example, it is possible to detect the location of the gaze position P in the depth direction by detecting an intersection (congestion) of sightline vectors 51 of the left and right eyeballs. Note that, sometimes the left and right sightline vectors 51 become more parallel to each other as a position of a gaze target gets away from the user 1. This may deteriorate accuracy of estimating the intersection of the respective sightline vectors 51. In addition, when using a method of combining the left and right vectors 51 and calculating a single sightline vector 51, sometimes it is difficult to determine which of the virtual object 40 placed at the front and the virtual object 40 placed in the back is selected.

For example, in FIG. 19, the translucent virtual object 40*h* placed at the front is selected. In this case, the process of correcting the gaze position P (second mode) is executed according to a predetermined gesture made by the user 1. Examples of the predetermined gesture include a body gesture of moving an upper body back and forth (see the right side in FIG. 16). In this case, for example, the gaze position P is corrected in such a manner that the gaze position P moves into the back when the user 1 tilts his/her upper body forth. In addition, the gaze position P is corrected in such a manner that the gaze position P moves toward the front when the user 1 tilts his/her upper body back.

In addition, the depth direction of the gaze position P may be adjusted according to a hand gesture made by the user 1. For example, the gaze position P is corrected in such a manner that the gaze position P moves into the back according to the user 1's behavior of moving his/her hand 5 forward. In addition, the gaze position P is corrected in such a manner that the gaze position P moves toward the front according to the user 1's behavior of moving his/her hand 5 toward the front. Alternatively, in the case where the user 1 uses the game controller or the like, the behavior of the hand 5 of the user 1 may be detected according to movement of the game controller.

As described above, it is possible to select the virtual object 40*i* placed behind the virtual object 40*h* by correcting the depth direction of the gaze position P according to a gesture made by the user 1. For example, the above-described processes may be performed.

As described with reference to Step 108 in FIG. 6, a rotation angle (correction amount) for correcting the sightline vector 51 is calculated for each loop processing. For example, the correction amount may be used for calculating the sightline vector 51 in the first mode or the like.

For example, in the second mode, the display control section calculates the correction amount for correcting the gaze position P or the like based on the sightline vector 51. For example, the rotation angle used for correcting the sightline vector 51 corresponds to the correction amount. It can be said that the correction amount indicates an amount of difference between the sightline vector 51 estimated by the HMD 100 and an actual sightline direction of the user 1. The correction amount is used as data for calibration of the sightline vector 51.

The display control section 23 calculates the sightline vector 51 in the first mode on the basis of the correction amount. For example, the sightline vector 51 estimated while the first mode is performed is appropriately rotated depending on the correction amount (rotation angle). This makes it possible to accuracy of estimating the sightline vector 51 in the first mode, and it is possible to display the guide image 30 or the like for showing a highly accurate gaze position P. In other words, the display control section 23 calculates a correction amount for correcting the gaze state in the second mode, and performs display of the guide image 30 in the first mode on the basis of the correction amount.

As described above, by using the correction amount calculated in the second mode, that is, the amount of adjustment of the sightline vector 51 as the data for calibration of a sightline, it is possible to improve the sightline detection accuracy while using the device. This makes it possible to drastically improve accuracy of the selection operation using gaze.

Figure 20:
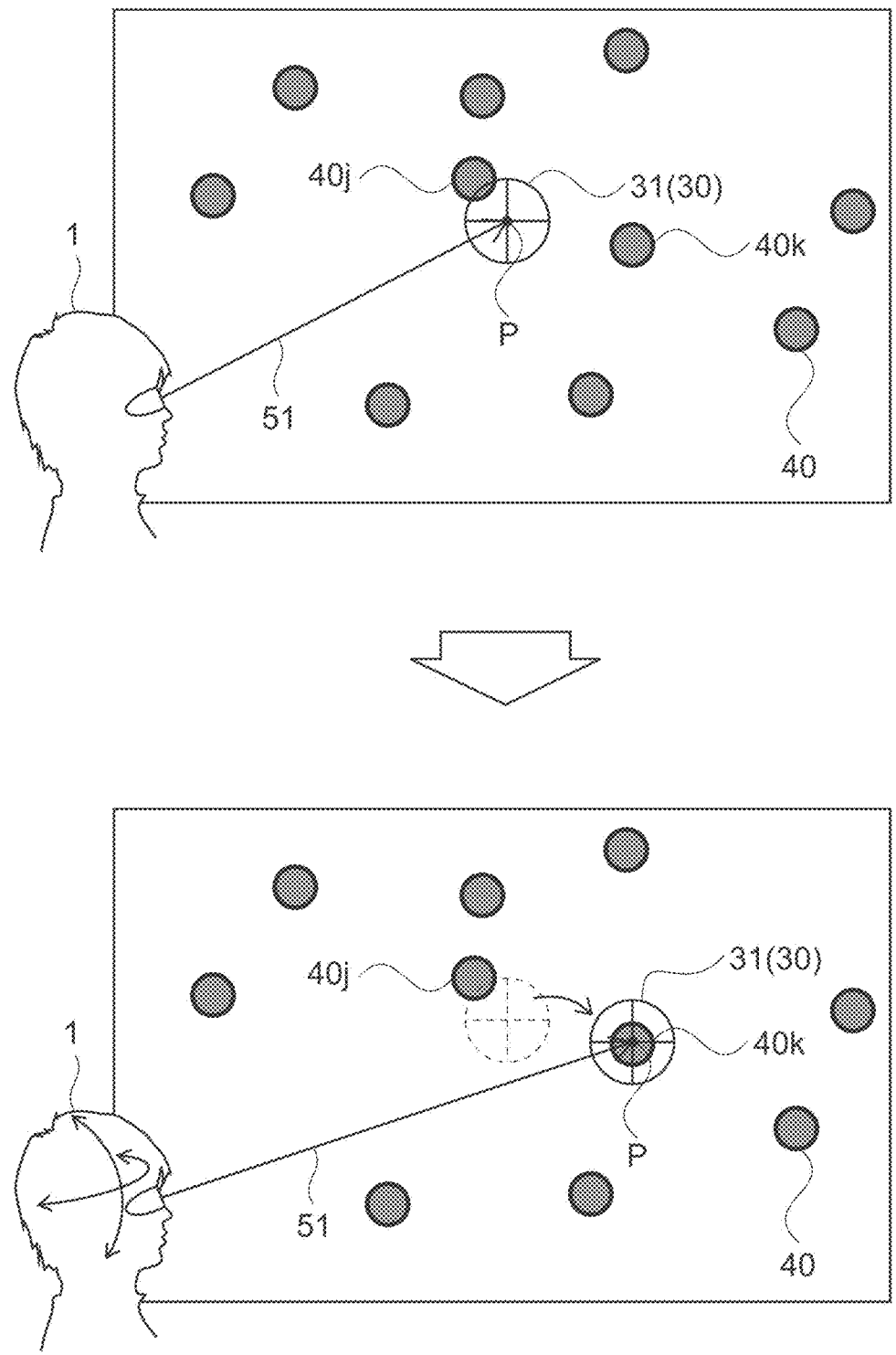
FIG. 20 is a schematic diagram illustrating an example of a selection process of a gaze target.
Figure 21:
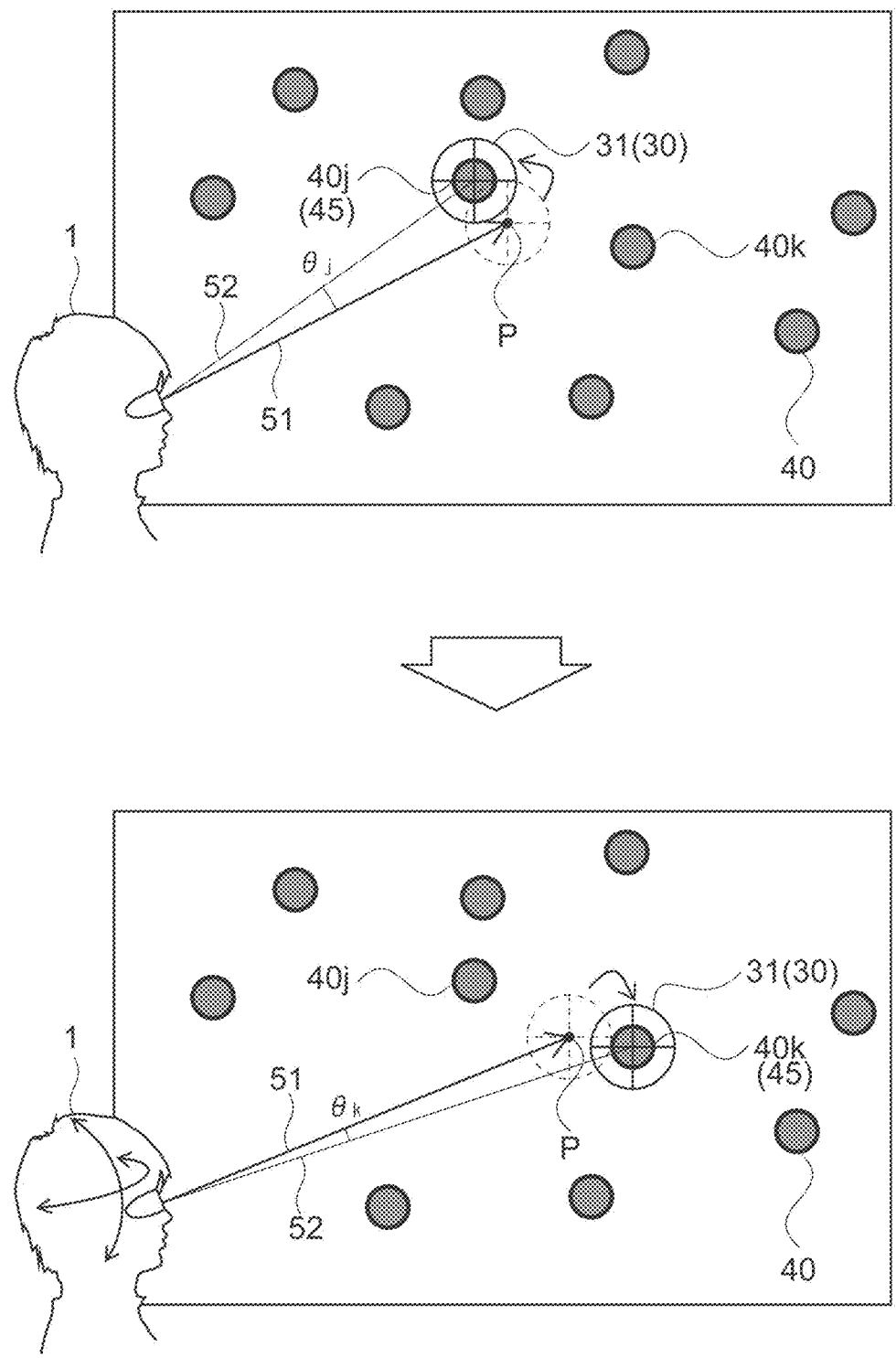
FIG. 21 is a schematic diagram illustrating an example of the selection process of a gaze target.

FIG. 20 and FIG. 21 are schematic diagrams illustrating an example of the selection process of a gaze target. Next, a process of selecting a virtual object 40 (gaze target) from among one or more virtual objects 40 displayed on a display will be described. The virtual object 40 (gaze target) is estimated to be gazed at by the user 1. Note that, the gaze target is not necessarily an object which the user is actually gazing at. Hereinafter, the virtual object 40 selected as the gaze target is referred to as a selection object 45.

In the selection process illustrated in FIG. 20, the gaze target is selected by operating the sightline vector 51 in such a manner that the sightline vector 51 overlaps the virtual object 40. In this case, it is possible for the user 1 to select the gaze target by completing the operation of matching the pointer image 31 for showing the gaze position P of the sightline vector 51 with a position (gaze target) which the user 1 is gazing at. For example, the selection process is executed on the basis of the correction process of the sightline vector 51 in the second mode as described with reference to FIG. 4 and the like.

With reference to the top of FIG. 20, the sightline vector 51 of the user 1 is directed to a vicinity of a virtual object 40*j*. The gaze position P based on the sightline vector 51 is displayed as the pointer image 31. Here, it is assumed that the object which the user 1 is actually gazing at is a virtual object 40*k* placed on a right side of the gaze position P. In this case, as illustrated in the bottom of FIG. 20, it is possible for the user 1 to correct the pointer image 31 (sightline vector 51) by making a head gesture.

For example, when the user rotates his/her head to the right, the pointer image 31 moves to the right and gets closer to the virtual object 40*k*. Next, the virtual object 40*k* is selected as the gaze target when the pointer image 31 overlaps the virtual object 40*k*. At this time, the virtual object 40*k* serves as a gaze object including the gaze position P, and serves as the selection object 45, which is selected as the gaze target.

As described above, in the example illustrated in FIG. 20, the position indicated by the pointer image 31 is identical with the gaze position P of the sightline vector 51. Therefore, by appropriately correcting the position while gazing at the pointer image 31, it is possible for the user 1 to select the virtual object 40, which the user 1 is actually gazing at, as the gaze target.

In the selection process illustrated in FIG. 21, a virtual object 40 close to the sightline vector 51 is automatically selected as the gaze target. This is a process of performing object snap for automatically selecting a close virtual object 40 from among the plurality of virtual objects 40, by using the sightline vector 51. Specifically, the display control section 23 selects a virtual object 40 having a smallest degree of separation from the sightline vector 51, as a gaze target of the user 1 from among the one or more virtual objects 40 serving as the gaze targets.

The degree of separation from the sightline vector 51 is a parameter capable of representing a degree of separation between the virtual object 40 and the sightline vector 51. For example, it can be said that a degree of separation between the sightline vector 51 and the a virtual object 40 that can fall within a central visual field of the user 1 is smaller than a degree of separation between the sightline vector 51 and the a virtual object 40 that can fall within a peripheral visual field of the user 1.

Typically, an angular interval θ between the sightline vector 51 and a position vector 52 of the virtual object 40 is used as the degree of separation from the sightline vector 51. Here, for example, the position vector 52 of the virtual object 40 is a vector connecting an origin O of the sightline vector 51 and a center of the virtual object 40. In other words, it can be said that the sightline vector 51 and the position vector 52 are three-dimensional vectors that share the same origin O. For example, the angular interval θ is an angle between the respective vectors on a plane including the sightline vector 51 and the position vector 52. By using the angular interval θ, it is possible to properly represent a degree of deviation from the sightline vector 51.

Note that, a parameter other than the angular interval may be used as the degree of separation. For example, a distance between the sightline vector 51 and the center of the virtual object 40 may be used as the degree of separation. Alternatively, for example, in the case where the respective virtual objects 40 are displayed on a plane, distances between the respective virtual objects 40 and the gaze position P on the plane may be used as the degree of separation.

In the selection process illustrated in FIG. 21, the display control section 23 selects a virtual object 40 having a smallest angular interval θ, as the gaze target. In other words, the object snap is performed for automatically selecting the virtual object 40 closest to the sightline vector 51 (virtual object 40 having a minimum angular interval θ).

For example, it is determined whether or not there is a virtual object 40 whose angular interval θ to the sightline vector 51 is a predetermined threshold or less. In the case where there are such virtual objects 40, a virtual object 40 having a smallest angular interval θ is selected as the gaze target (selection object 45). At this time, the pointer image 1 or the like is displayed in such a manner that the pointer image 31 indicating the gaze position P of the sightline vector 51 overlaps the selection object 45. In addition, in the case where there is no virtual object 40 whose angular interval θ is the predetermined threshold or less, the process of selecting the gaze target is not executed, and the pointer image 31 is displayed at the gaze position P. The threshold for determining the angular interval θ is appropriately set depending on the accuracy of detection of the sightline vector 51, the density of the virtual objects 40, and the like, for example.

With reference to the top of FIG. 21, it is assumed that an angular interval θj between the sightline vector 51 and the position vector 52 of the virtual object 40j is smallest, in comparison with the other virtual objects 40. Note that, it is assumed that the sightline vector 51 does not intersect with the virtual object 40j. For example, when the angular interval θj becomes the predetermined threshold or less, the virtual object 40j is selected as the selection object 45, and the pointer image 31 is displayed in such a manner that the pointer image 31 overlaps the virtual object 40j at the gaze position P. This makes it possible to notify the user 1 that the virtual object 40j is selected. Note that, even when the virtual object 40j is selected, the sightline vector 51 is not necessarily corrected.

Here, it is assumed that the object which the user 1 is actually gazing at is a virtual object 40k placed on a right side of the gaze position P. In this case, as illustrated in the bottom of FIG. 21, it is possible for the user 1 to correct the sightline vector 51 and select the virtual object 40k by making a head gesture. For example, the selection process is executed on the basis of the correction process of the sightline vector 51 in the second mode as described with reference to FIG. 4 and the like.

For example, when the user 1 rotates his/her head to the right, the sightline vector 51 (gaze position P) moves to the right and gets closer to the virtual object 40k. The pointer image 31 is displayed at the gaze position P when the angular interval θj between the sightline vector 51 and the virtual object 40j becomes larger than a threshold during the above-described process. In addition, the virtual object 40k is selected as the selection object 45 when the gaze position P gets closer to the virtual object 40k and the angular interval θk to the virtual object 40k becomes smaller than the threshold. At this time, the pointer image 31 is displayed in such a manner that the pointer image 31 moves from the gaze position P and the pointer image 31 overlaps the virtual object 40k. Note that, in the case where an interval between the virtual objects 40j and 40k is narrow or in other cases, sometimes it is possible to directly switch the selection object 45 from the virtual object 40j to the virtual object 40k. This allows the user 1 to select the virtual object 40k, which the user 1 is actually gazing at, as the gaze target.

As described above, in FIG. 21, the process of putting the object closest to the sightline vector 51 into the selected state is executed with regard to the plurality of virtual objects 40 (object group). This makes it possible to easily select the target in a short period of time. In addition, the gaze state of the user 1 is determined, and an amount of rotation of the head is reflected in adjustment of the sightline vector. Therefore, it is possible to change the selection object 45 by using the head gesture. This makes it possible perform an appropriate selection operation by using correction of the sightline vector 51, and quickly select the desired object. In addition, as described later, it is possible to use the correction amount (such as angular interval) calculated by automatically selecting the virtual object 40, as the calibration data.

Note that, as described with reference to FIG. 21, the process of automatically selecting the virtual object 40 can be applied to the case where the correction process of the sightline vector 51 (second mode) is not performed. In other words, the above-described object snap function may be implemented on the HMD or the like that does not correct the sightline vector 51.

In the above description, the gaze position P of the sightline vector 51 estimated by the device is clearly display by using the guide image 30 such as the pointer image 31. For example, the orientation of the sightline vector 51 and the gaze position P becomes unknown in the case where the pointer image 31 is not illustrated or in the case where the gaze position P is not identical to the position indicated by the pointer image 31 (such as a case where the virtual object 40 is automatically selected). In this case, a clue to make the head gesture or the like is lost, and it may become difficult to adjust the sightline vector 51.

As described above, even in a situation where the gaze position P is not clearly displayed, it is possible to display an aid to adjust the sightline vector 51 by using the virtual object 40, for example. Next, details of a method of displaying the virtual objects 40 will be described.

Figure 22:
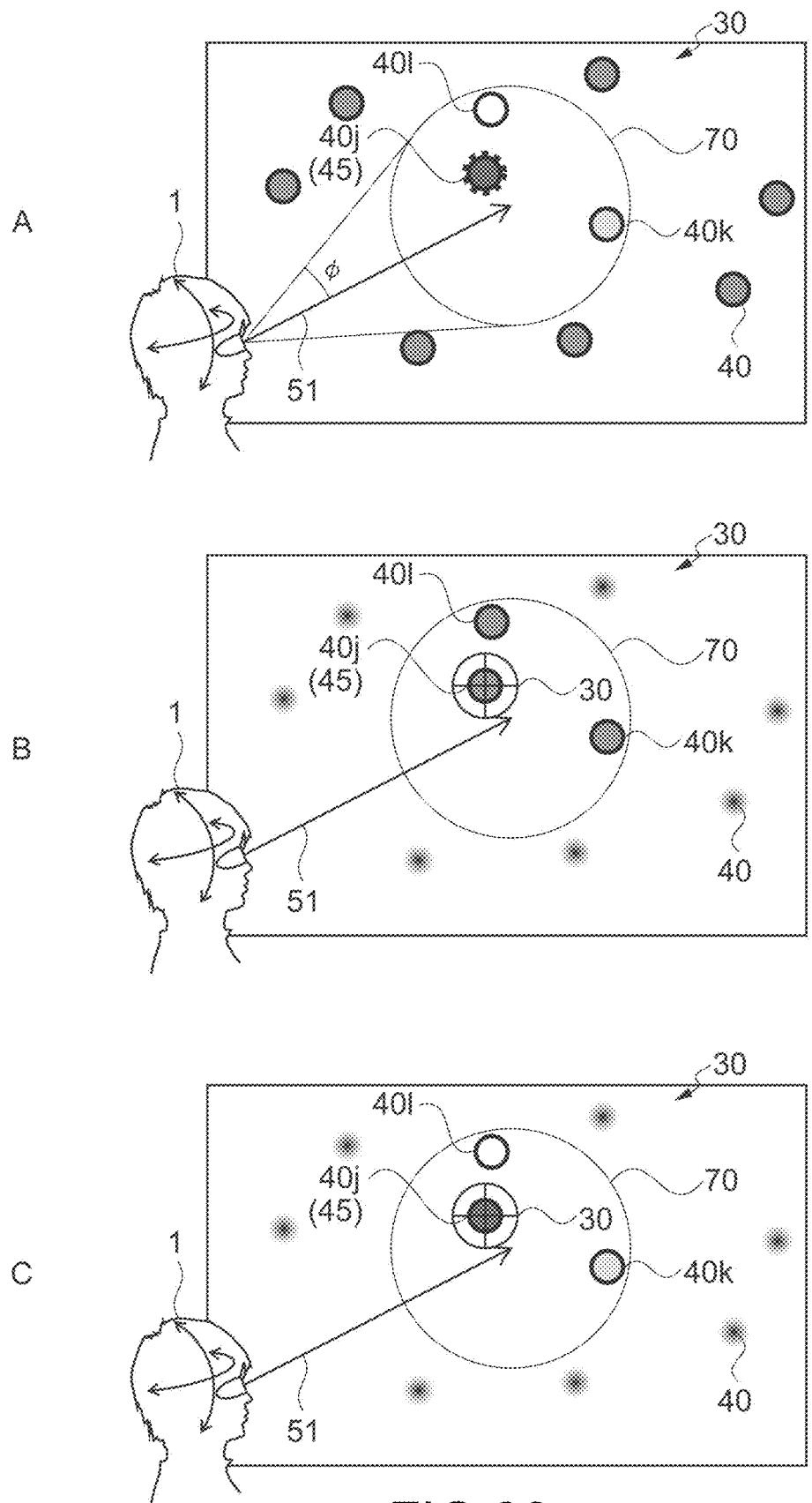
FIG. 22 is a schematic diagram illustrating display examples of virtual objects serving as gaze targets.

FIG. 22 is a schematic diagram illustrating display examples of virtual object 40 serving as the gaze targets. FIG. 22A to FIG. 22C schematically illustrates the virtual objects 40 displayed by using different display processes. These images including one or more virtual objects 40 serving as the gaze target function as the guide images 30 for showing the gaze state based on the sightline vector 51. Note that, for example, each of the display processes illustrated in FIG. 22 is executed in the second mode (gaze state) of correcting the sightline vector 51, and is terminated when the second mode is turned off.

In FIG. 22, the display control section 23 controls the display 15 in such a manner that the display 15 displays the guide image 30 including display of one or more objects, which change according to degrees of separation between the one or more virtual objects 40 and the sightline vector 51. In other words, an image (guide image 30) including the virtual objects 40 is generated and displayed on the display 15. The virtual objects 40 have display parameters or the like, which are changed depending on the degrees of separation. Here, the angular intervals θ are used as the degrees of separation from the sightline vector 51. The angular intervals θ have been described above with reference to FIG. 21. Note that, a process using degrees of separation other than the angular intervals θ may be executed.

As described above, by using the degrees of separation from the sightline vector 51 (such as angular intervals θ) as indicators, it is possible to change the display of the respective virtual objects 40 according to change in the gaze of the user 1. This makes it possible to notify the user 1 of information indicating the orientation of the sightline vector 51 or the location of the gaze position P, even in the case where the sightline vector 51 and the gaze position P are not clearly displayed.

In the display process illustrated in FIG. 22A, respective colors of the virtual objects 40 are set depending on the angular intervals θ. For example, a virtual object 40 that is distant from the sightline vector 51 and that has a large angular interval θ is displayed with light color, and a virtual object 40 that is close to the sightline vector 51 and that has a small angular interval θ is displayed with dark color. Therefore, in this case, shading of the respective virtual objects changes according to change in the sightline vector 51. It can be said that the object is highlighted more as the object gets closer to the sightline vector 51.

In FIG. 22A, the process is performed on the virtual objects 40 included in a predetermined angular range 70 based on the sightline vector 51. Typically, the angular range 70 is set as a conical range by using the sightline vector 51 as a central axis. For example, the conical angular range 70 is a range obtained by rotating a straight line about the sightline vector 51. The straight line passes through the origin O of the sightline vector 51 and intersects with the sightline vector 51 at an angle φ. FIG. 22A schematically illustrates the angular range 70 by using a circular range centered on the gaze position P of the sightline vector 51.

Note that, in the example illustrated in FIG. 22A the virtual object 40*j* selected as the gaze target is displayed while being surrounded by a dotted line in such a manner that the virtual object 40 becomes identifiable. At this time, the image for showing the sightline vector 51 and the gaze position P is not displayed. For example, in the case where the user 1 makes a head gesture to select an object other than the virtual object 40*j*, it is possible to refer to change in shading of the respective virtual objects 40 in the angular range 70, as a clue.

Figure 23:
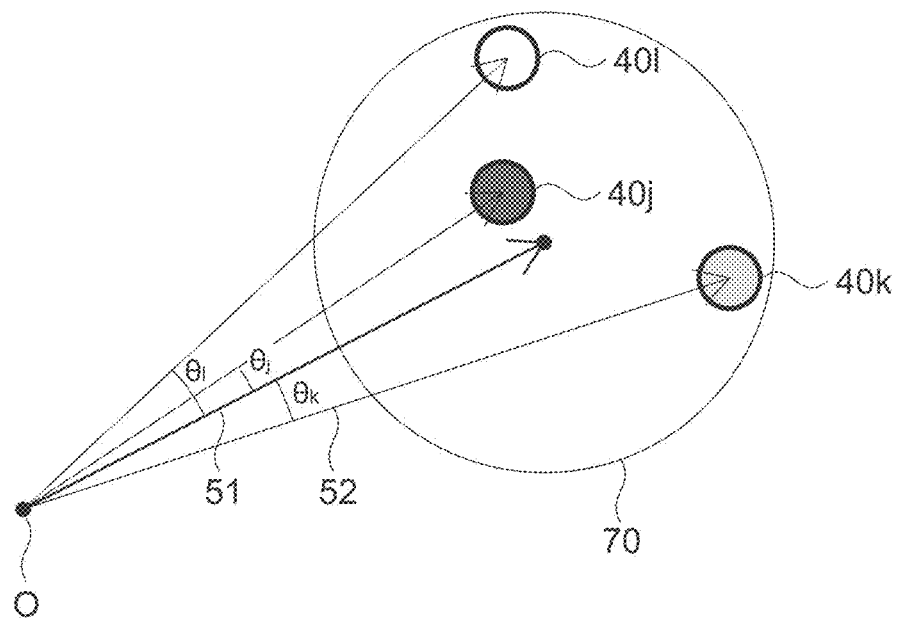
FIG. 23 is a schematic diagram for describing a display process depending on angular intervals.

FIG. 23 is a schematic diagram for describing a display process depending on angular intervals θ. FIG. 23 illustrates virtual objects 40*j*, 40*k* and 40*l* included in the angular range 70 in FIG. 22A, and angular intervals θj, θk, and θl between the sightline vector 51 and the respective virtual objects 40. Next, a process of changing display of the virtual objects 40*j*, 40*k*, and 40*l* will be described.

First, respective vectors (position vectors 52) connecting the origin O of the sightline vector 51 and the virtual objects 40*j*, 40*k*, and 40*l* serving as processing targets are calculated. Next, the angular intervals (θj, θk, and θl) of angles between the sightline vector 51 and the position vectors 52 are calculated. It is possible to emphasize the objects by changing display of the respective objects in proportion to the angular intervals.

For example, it is assumed that the colors of the respective virtual objects 40 are designated by using RGB of 8-bit gradation. At this time, the colors of the virtual objects 40 are set as follows:

$$RGB=(255, Xg, 255)$$

where Xg represents a parameter indicating a gradation value of green (G). In this case, red (R) and blue (B) are set to a fixed value (255), and only green (G) is a variable.

The variable Xg is set as follows:

$$Xg = \theta \cdot C$$

where any of the above-described angular intervals θj, θk, and θl is substituted into θ, and C represents slope of change. The slope of change C is appropriately set depending on density or the like of the virtual objects 40, for example. In addition, Xg is adjusted in such a manner that clamping occurs when Xg reaches a maximum value (255) of the gradation.

In the case of using such a method, the color of the virtual object 40 becomes darker magenta as the angle between the sightline vector 51 and the virtual object 40 gets smaller. The color of the virtual object 40 becomes more whitish as the virtual object 40 gets away from the sightline vector 51. Note that, FIG. 23 schematically illustrates shades of magenta by using grayscale shading. For example, the virtual object 40*j* has a minimum angular interval θj and is closest to the sightline vector 51. Therefore, the virtual object 40*j* has dark magenta color. On the other hand, the virtual object 40*l* has a maximum angular interval θl and is farthest away from the sightline vector 51. Therefore, the virtual object 40*l* has dark whitish color.

As described above, when appearance of the objects close to the sightline vector 51 are changed in proportion to distances (angular intervals θ) from the sightline vector 51, it is possible to give feedback to the user 1 with regard to information indicating adjustment directions for correcting the sightline vector 51, for example. As a result, it is possible for the user 1 to decide a head movement direction or the like with reference to the colors or the like of the respective objects in the peripheral visual field.

Instead of the colors of the virtual objects 40, it is also possible to execute a display process of changing the sizes, shapes, behaviors, or the like of the virtual objects 40. For example, the process is executed in such a manner that the virtual object 40 has a larger size or a more complicated shape as the angular interval θ gets smaller. This makes it possible to accentuate the virtual object 40. In addition, in the case where the virtual object 40 performs predetermined behavior (such as rotation behavior, vibrating behavior, or a character behavior), it is also possible to increase an amount of behavior as the angular interval θ gets smaller. As described above, it is possible to execute the process of changing at least one of the size, shape, and behavior of the one or more virtual objects 40 according to the angular intervals θ. In addition, the method and the like of highlighting the virtual object 40 are not limited.

In the display process illustrated in FIG. 22B, a blur process is executed on the virtual objects 40, which are not included in the predetermined angular range 70 based on the sightline vector 51, among the one or more sightline objects 40. It can be said that the display process is a process of clearly display objects close to the sightline vector 51, blurring objects distant from the sightline vector 51, and displaying the blurred objects.

For example, the virtual objects 40*j*, 40*k*, and 40*l* included in the angular range 70 are displayed as they are. On the other hand, for example, the blurring process using a blurring filter or the like is executed on the other virtual objects 40 that are not included in the angular range 70. Note that, in the example illustrated in FIG. 22B, the pointer image 31 is displayed in such a manner that the pointer image 31 overlaps the virtual object 40*j* selected as the gaze target, and it is possible to identify the gaze target. For example, when the user 1 moves his/her gaze, the angular range 70 also moves, and the range of the blurring process also changes. The movement of the angular range 70 is a clue to correct the sightline vector 51.

For example, in the case where display of the respective virtual objects 40 are independently changed as illustrated in FIG. 22A but the number of the objects close to the sightline vector 51 is small, sometimes such display of the respective virtual objects 40 does not serves as the clue. On the other hand, it is possible to easily recognize the orientation or the like of the sightline vector 51 by blurring display of the virtual objects 40 that are not included in the angular range 70. Note that, instead of the blurring process, it is also possible to execute a hiding process of hiding the virtual objects 40 that are not included in the angular range 70. In this case, only the virtual objects 40 that are included in the angular range 70 are displayed. This makes it possible to support adjustment of the sightline vector 51.

In the display process illustrated in FIG. 22C, a process of combining the display processes illustrated in FIG. 22A and FIG. 22B. In other words, the virtual objects 40 included in the angular range 70 are displayed by using colors and sizes depending on the angular intervals θ, and the blurring process or the like is executed on the virtual objects 40 that are not included in the angular range 70. This makes it possible to easily device the head movement direction or the like to correct the sightline vector 51.

Note that, as described with reference to FIG. 22 and FIG. 23, the process of displaying the virtual object 40 can be applied to the case where the correction process of the sightline vector 51 (second mode) is not performed. In other words, the HMD or the like that does not correct the sightline vector 51 may execute a process or the like of displaying the virtual object 40 depending on a degrees of separation from the sightline vector 51.

Figure 24:
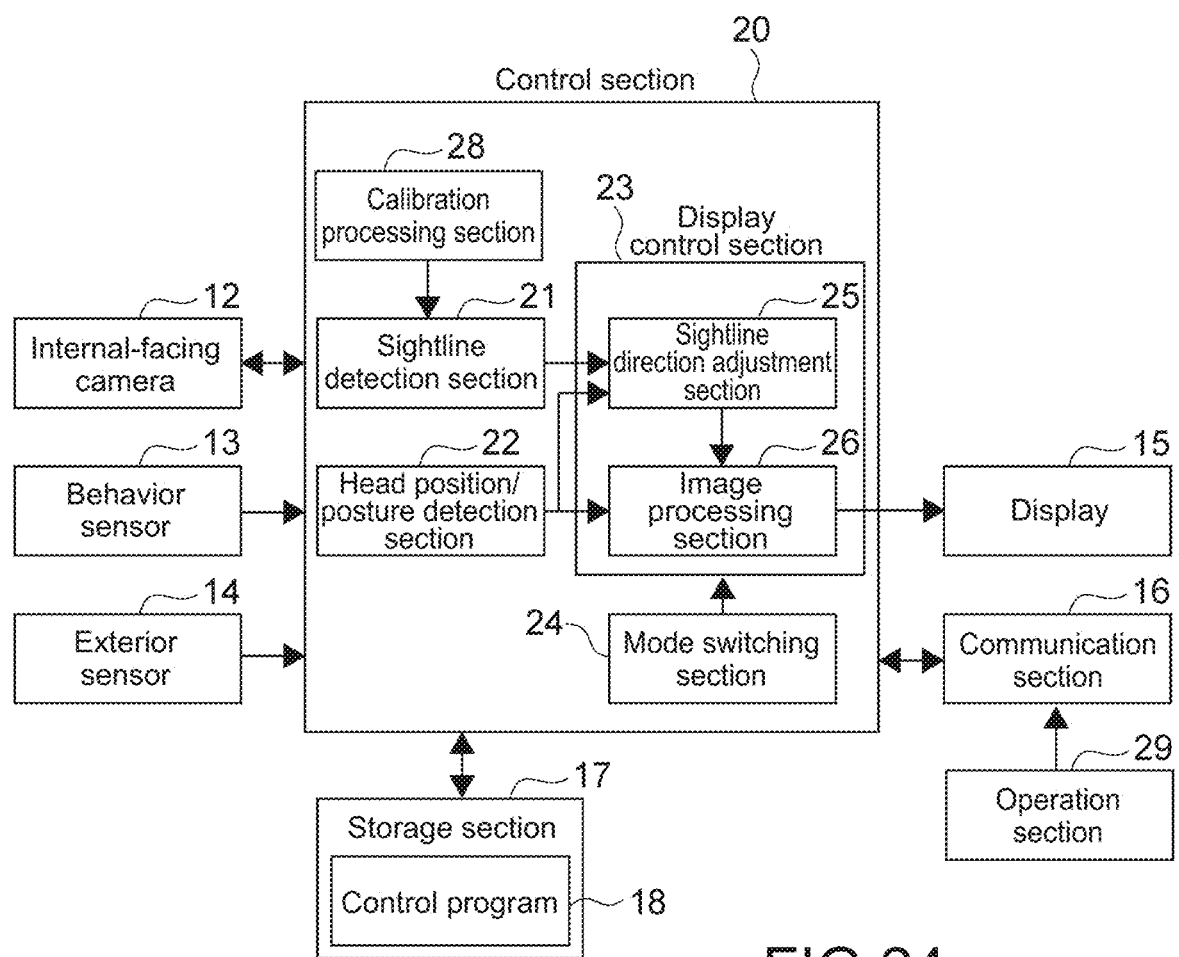
FIG. 24 is a block diagram illustrating a functional configuration example of an HMD according to another embodiment.

FIG. 24 is a block diagram illustrating a functional configuration example of an HMD according to another embodiment. An HMD 200 is obtained by adding a calibration processing section 28 to the controller 20 (control section) of the HMD 100 described with reference to FIG. 2. In addition, an operation section 29 is connected to the HMD 200 via the communication section 16. Hereinafter, description will be omitted with regard to structural elements similar to the HMD 100

The calibration processing section 28 executes the calibration process of calibrating the sightline vector 51 estimated by the sightline detection section 21. In addition, the calibration processing section 28 generates data for calibration (hereinafter, referred to as calibration data). As described later, the HMD 200 generates calibration data while content is being processed. The calibration process is executed by using the calibration data, and the sightline vector 51 is sequentially calibrated. Therefore, it is possible for the HMD 20 (calibration processing section 28) to perform running calibration, which is a process of performing calibration while content is executed.

The calibration process is a process of calibration for matching the sightline direction (sightline vector 51) detected by the device with an actual sightline direction (real sightline vector 50). In general, in the case of a device that performs an input operation through gaze, a dedicated UI screen is displayed for performing calibration when use of the device starts. Subsequently, calibration is performed. In this case, for example, respective sightline directions are detected when gazing at a plurality of points displayed on the UI screen. Next, correction angles of the respective points in the detected sightline directions are calculated.

The correction angle is a difference between the sightline direction detected by the device, and an angle of a sightline direction (such as an ideal sightline direction), which should be detected when gazing at each point. For example, an amount of rotation, which is necessary to match the detected sightline direction with the ideal sightline direction, is used as the correction angle. Typically, the correction angle is represented as a quaternion indicating rotation in a three-dimensional space. Alternatively, it is also possible to represent the correction angle by using an amount of rotation (roll, pitch, and yaw) around an orthogonal axis in the three-dimensional space.

The calibration data is recorded in association with the sightline direction (sightline vector 51) detected when gazing at each point and the correction angle of the sightline direction. Such data is referred when calibrating the sightline direction. For example, in the case of calibrating a current sightline direction, one or more correction angles associated with a direction close to the current sightline direction are selected from the calibration data. The correction angle of the current sightline direction is calculated through weighted mean of the selected correction angle on the basis of proximity to the current sightline direction. As described above, it is possible to calibrate the current sightline direction by using the correction angle calculated through the weighted mean.

The calibration processing section 28 of the HMD 200 also generates the calibration data during execution of content. As a result, for example, the number of data points to be used for calibrating the sightline vector 51 increases, and it is possible to drastically improve accuracy of calibrating the sightline vector 51. Note that, the method of calibrating the sightline vector 51 is not limited, and other methods may be used.

The operation section 29 is a controller that receives various kinds of operations input by the user 1. For example, the operation section 29 receives a decision operation, a selection operation, and the like input by the user while the content is being executed. For example, a wired or wireless remote controller including a button, a switch, or the like is used as the operation section 29. In addition, a device such as a mouse or a keyboard may be used as the operation section 29.

Figure 25:
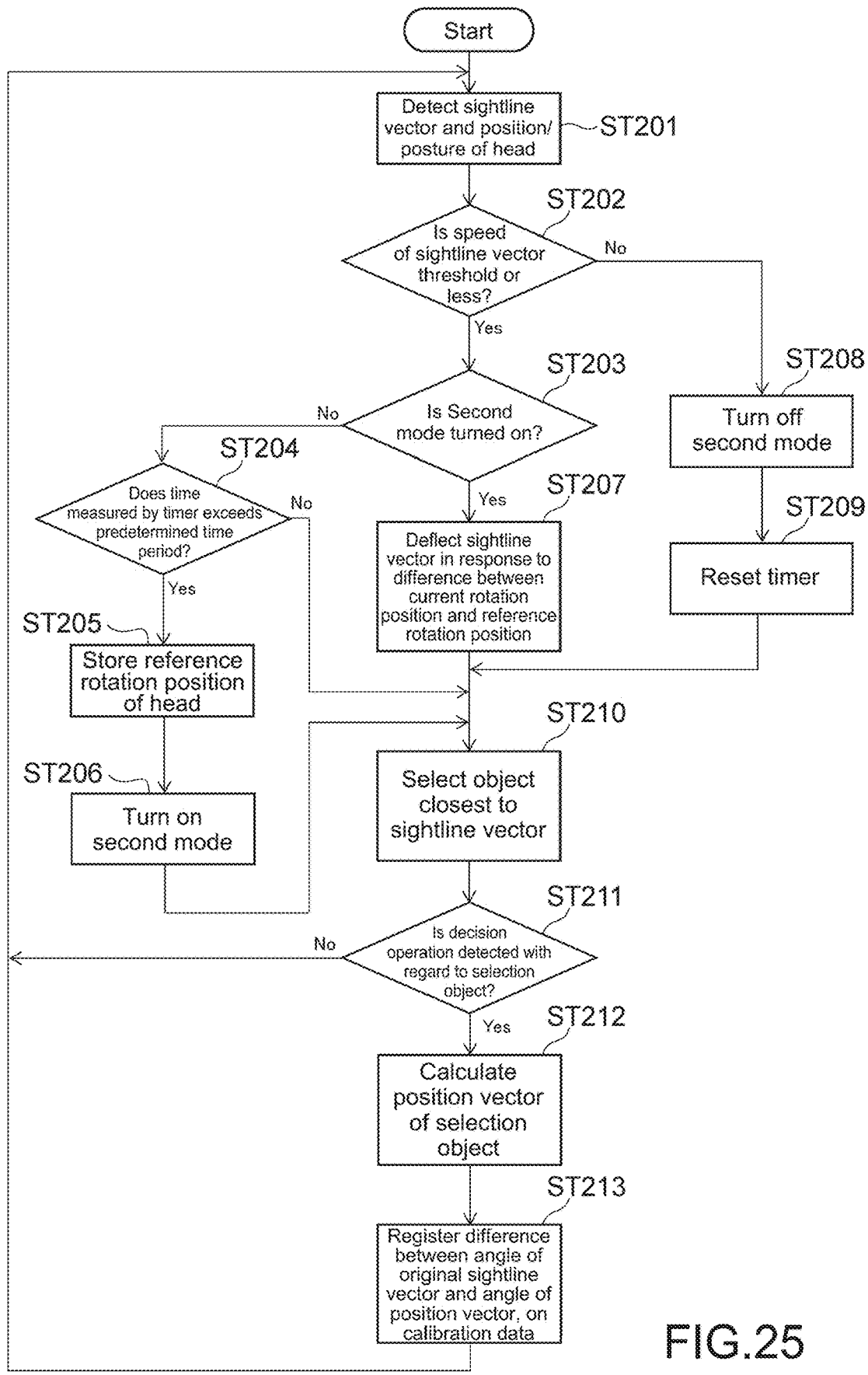
FIG. 25 is a flowchart illustrating a basic behavior example of the HMD according to the other embodiment.

FIG. 25 is a flowchart illustrating a basic behavior example of the HMD 200 according to the other embodiment. The process illustrated in FIG. 25 is a process that the HMD 200 repeatedly executes in parallel with the process of content. Next, a correction process of a sightline vector and a generation process of calibration data to be executed by the HMD 200 will be described.

First, the sightline detection section 21 detects a sightline vector 51, and the head position and posture detection section 22 detects the position and posture (rotation position) of the head of the user (Step 201). Next, it is determined whether or not the speed of the sightline vector 51 is a predetermined threshold or less (Step 202). For example, rotation speed of the sightline vector 51 is calculated, and then a determination is made with regard to a threshold of the rotation speed. This makes it possible to discriminate a static state (state where gaze moves slowly or hardly moves) from a dynamic state (state where gaze moves quickly) with regard to the gaze of the user 1, for example. For example, a threshold related to speed of the sightline vector 51 may be appropriately set depending on human characteristics, types of content, or the like.

In the case where it is determined that the speed of the sightline vector 51 is the threshold or less (Yes in Step 203), it is determined whether or not the second mode is turned on (Step 203). In the case where the second mode is turned off, that is, in the case where the first mode is turned on (No in Step 203), it is determined whether or not time measured by a timer exceeds a predetermined time period (Step 204). The timer measures a time period where the gaze of the user 1 is in the static state. Specifically, a time period where the gaze is in the static state is measured after the second mode is turned off (Step 209 to be described later). For example, the threshold related to the timer (predetermined time period) may be appropriately set depending on human characteristics, types of content, or the like.

In the case where the time measured by the timer exceeds the predetermined time period (Yes in Step 204), a reference rotation position of the head is stored (Step 205). At this time, a latest sightline vector 51 calculated in Step 201 is also stored. The second mode is turned on (Step 206) when the reference rotation position and the sightline vector are stored. As described above, the HMD 200 initiates the second mode when the time period where the gaze of the user 1 is in the static state exceeds the threshold.

As described above, it is possible to correct the sightline vector 51 through a head gesture in the second mode. In addition, when the second mode is turned on, the HMD 200 switches the display method of the virtual objects 40 to the display method described with reference to FIG. 22A to FIG. 22C. When the second mode is initiated, processes in Step 210 and subsequent steps are executed. Note that, in the case where the time measured by the timer does not exceeds the predetermined time period (No in Step 204), the processes in Step 210 and subsequent steps are executed in the first mode without switching to the second mode.

Retuning to Step 203, a process of correcting the sightline vector 51 is executed (Step 207) in the case where the second mode is turned on (Yes in Step 203). Here, a process of deflecting (rotating) the sightline vector 51 according to a difference between the current rotation position and the reference rotation position stored in Step 205 is executed as the process of correcting the sightline vector 51. For example, the process in Step 207 is a process similar to the process described with reference to Step 108 in FIG. 6. This makes it possible to correct the sightline vector 51 by using a head gesture of the user 1. When sightline vector 51 is corrected, processes in Step 210 and subsequent steps are executed.

Returning to Step 202, in the case where it is determined that the speed of the sightline vector 51 is the threshold or more (No in Step 202), it is determined that the gaze of the user 1 is in the dynamic state, the second mode is turned off, and the first mode is turned on (Step 208). Note that, in the case where the second mode has already been turned off (or in the case where the first mode has already been turned on) at the time of execution of step 202, this state is maintained. In addition, the timer resets (Step 209) when Step 208 is executed.

As described above, in the case where the gaze of the user 1 is in the dynamic state, the second mode is terminated and the timer that has measured the time period of the static state resets. Note that, after the reset, the timer starts measurement again. Therefore, in the case where the speed of the sightline vector 51 is faster than the threshold, the timer resets each time the loop processing is executed. After the timer resets, the processes in Step 210 and subsequent steps are executed.

In Step 210, a virtual object 40 closest to the sightline vector 51 is selected. Here, the process of automatically selecting the virtual object 40 (object snap) is executed as described with reference to FIG. 21. For example, the sightline vector 51 is recorded when Step 210 is executed. The virtual objects 40 whose angular interval θ to the sightline vector 51 is a predetermined threshold or less are detected, and a virtual object 40 having a smallest angular interval θ is selected as the gaze target (selection object 45) from among the virtual objects 40. Note that, the selection object 45 is displayed in such a manner that the pointer image 31 or the like overlaps the selection object 45 to notify the user 1 that the selection object 45 is selected.

When the selection object 45 is selected, the calibration processing section 28 starts processes (Step 211 to Step 210) for generating calibration data. First, it is determined whether or not a decision operation is detected with regard to the selection object 45 (Step 211). Here, for example, the decision operation is an operation input by the user 1 through the operation section 29, and the decision operation is performed when the user 1 determines the choice. Next, details of the decision operation will be described with reference to FIG. 21.

For example, as illustrated in the image on the top of FIG. 21, it is assumed that the virtual object 40j close to the sightline vector 51 is automatically selected. At this time, it can be considered that the user 1 does not perform the decision operation through the operation section 29 if the virtual object 40j is not an object that the user 1 actually desires. In this case, the virtual object 40j is automatically selected as the selection object 45, but the decision operation of determining this choice is not performed.

In addition, for example, as illustrated in the image on the bottom of FIG. 21, it is assumed that the user 1 corrects the sightline vector 51 to select the virtual object 40k that the user 1 actually desires (the user 1 is actually gazing at). At this time, it is considered that the user 1 performs the decision operation because the desired object is selected. In this case, the virtual object 40k is automatically selected as the selection object 45, and the user 1 performs the decision operation of determining this choice.

As described above, it can be said that the decision operation is an operation of determining a choice in the case where a virtual object 40 that the user 1 actually gazing at is identical to the selection object 45 selected through the selection process. By reference to presence/absence of the decision operation, it is possible to determine a virtual object 40 that the user 1 is actually gazing at, and appropriately detect the real gaze position of the user 1, for example.

In the case where the decision operation is not detected with regard to the selection object 45 (No in Step 211), the processes in Step 201 and subsequent steps are executed again. Note that, the process returns to Step 201 and next loop processing starts even in the case where no object is selected in Step 210. On the other hand, in the case where the decision operation is detected with regard to the selection object 45 (No in Step 211), the position vector 52 of the selection object 45 is calculated (Step 212). For example, a vector connecting the origin O of the vector 51 and the center of the selection object 45 is calculated as the position vector 52 of the selection object 45.

When the position vector 52 is calculated, a difference between the angle of the original sightline vector 51 and the angle of the position vector 52 is calculated, and the difference is registered on the calibration data (Step 213). Here, the original sightline vector 51 is a sightline vector 51 that is not corrected by using the head gesture. For example, an amount of rotation (such as quaternion) between the original sightline vector 51 and the position vector 52 is calculated as the difference between angles. Next, the original sightline vector 51 and the difference between the angles are recorded on the calibration data in association with each other. This makes it possible to successively add data points of the calibration data.

For example, in the case where Step 207 is executed and the sightline vector 51 is corrected, the uncorrected sightline vector 51 (sightline vector 51 stored in Step 205) serves as the original sightline vector 51. In this case, instead of the sightline vector 51 that is deviated due to the correction, a difference between the angle of the sightline vector 51 when the correction is initiated and the angle of the position vector 52 of the selection object 45 is calculated. This makes it possible to correct a sightline vector 51 that is actually detected by the device.

In addition, in the case where Step 207 is not executed and the sightline vector 51 is not corrected, the sightline vector 51 to be obtained when Step S210 is executed serves as the original sightline vector 51. In other words, in the case where the sightline vector 51 is not corrected on the basis of the head gesture or the like, a difference between the angle of the sightline vector 51 used for the automatic selection and the angle of the position vector 52 of the selection object 45 is calculated. In the case where the selection object 45 is automatically selected as described above, it is possible to add new calibration data, and this addition is triggered by the decision operation performed by the user 1.

In addition, it is also possible to add the correction amount used for the correction process of the sightline vector 51 in Step 207 (such as angle adjusted depending on head rotation, for example), into the calibration data. This makes it possible to use the angle that is actually corrected by the user 1 as the calibration data, and to improve accuracy of calibration. Note that, it is also possible to use the correction amount of the sightline vector 51 as the calibration data even in the case where the virtual object 40 is not automatically selected, or other cases.

When the calibration data is registered, the process returns to Step 201, and next loop processing is executed. In addition, in Step 201, it is possible to use the newly added calibration data for detecting the sightline vector 51. As described above, the HMD 200 successively accumulates the calibration data even while executing the content. This makes it possible to sufficiently enhance accuracy of estimating the sightline vector 51.

In general, sometimes it is necessary to correct a difference between a result of detecting a sightline and a direction which the user is actually gazing at, with regard to the content based on the sightline. In such a case, it is ideal to perform the calibration while content is being operated. However, a screen displayed while the content is being executed includes a plurality of objects serving as the gaze target unlike a UI screen dedicated to the calibration. Therefore, in many cases, it is difficult to detect a position that is actually gazed at by the user. Accordingly, for example, in the case where it is necessary to perform a calibration, it can be considered that the screen is temporarily switched to the UI screen dedicated to calibration, and the calibration is performed again. However, this method requires to interrupt the operation of the content, and this may hamper convenience.

In addition, in the case where there are a plurality of objects serving as the gaze targets, the objects have to be positioned apart from each other more than a variation range of gaze detection, to detect which object is actually gazed at by the user. However, the variation range of gaze accuracy varies from person to person, and it is difficult to keep a sufficient distance between the objects in a limited space. In addition, to widen the intervals between the objects in the content screen, it is necessary to prepare layout tailored to the calibration or the like in advance, and it is necessary to introduce a mechanism for dynamically separate the objects from each other. This may limit application of the present technology.

The HMD 200 automatically select the virtual object 40. In addition, it is possible for the user 1 to appropriately change a selection result obtained through the automatic selection, by correcting the sightline vector 51 through the head gesture or the like (see FIG. 21). Therefore, it is possible for the user 1 to easily select a desired virtual object 40 even in the case where the virtual objects 40 are densely gathered, for example.

In addition, when correcting the sightline vector 51, the virtual objects 40 are displayed depending on degrees of separation from the sightline vector 51 (see FIG. 22). This makes it possible to notify the user 1 of a correction direction of the sightline vector 51, and it is possible to easily perform an operation of changing the automatically selected object or the like.

In addition, the HMD 200 detects the decision operation performed by the user 1, and determines the choice of the virtual object 40 (selection object 45). Such a decision operation makes it possible to determine which of the virtual objects 40 is actually gazed at by the user 1. This makes it possible to newly generate data that is usable as the calibration data (such as a difference between the angle of the real sightline vector 50 of the user 1 and the angle of the sightline vector 51).

As described above, by using the HMD 200, it is possible for the user 1 to correct the sightline vector 51 when needed and easily select a desired virtual object 40 without intentionally rearranging the object group serving as the selection targets. In addition, even while content using the sightline is being executed, it is possible to improve accuracy of detecting the sightline vector 51 step-by-step by accumulating the calibration data including angular differences or the like when the virtual object 40 is selected.

In the above-description, the position and posture information of the eyeballs of the user (eyeball image) has been detected by using the internal-facing camera. The present technology is not limited thereto. For example, the gaze point P of the user may be detected on the basis of eyeball potential. In general, a cornea (pupil) side of a human eyeball charges positively, and a retina side of the human eyeball, which is opposite from the cornea (pupil) side, charges negatively. For example, when the HMD is provided with a predetermined electric potential sensor (not illustrated), it is possible to detect change in potential caused by movement of the eyeball. The sightline vector 51 and the gaze position P of the user may be detected on the basis of such information related to change in potential (position and posture information of eyeball).

In the above embodiment, the immersive HMD provided with the display device has been described. However, the selection operation using the sightline according to the present technology is applicable not only to the immersive HMD, but also to any display device.

For example, an optical transmission type HMD may be used. The optical transmission type HMD according to the present disclosure may include an internal-facing camera for detecting a sightline and a sensor such as an external camera for measuring a three-dimensional space in a real world, and may appropriately detect a gaze position P or the like by using information regarding real objects. The optical transmission type HMD may superimpose the virtual objects on the real space on the basis of three-dimensional coordinates in the real space, that is, a global coordinate system, as if the virtual objects were in the real space. By using the optical transmission type HMD, it is possible for the user 1 to experience an AR space, for example. Sometimes a real object in the real space serves as an object serving as the gaze target of the user 1. Even in this case, it is possible to correct the gaze position P and the like by appropriately detecting the sightline vector 51, the head gesture, or the like of the user 1.

Alternatively, for example, the selection operation may be performed through gaze by using a display device such as a personal computer (PC) display or a TV. In this case, it is possible to estimate the sightline vector 51 of the user 1 who is gazing at the PC display or the like, by using a camera that captures an image of a face (eyeballs) of the user 1, for example. In addition, for example, the user's head gesture of rotating his/her head or the like is detected by using a similar camera or the like. This makes it possible to correct the gaze position P and the like.

In the above description, the information processing method according to the present technology has been executed by using the computer such as the HMD 100, which has been operated by the user 1. However, the information processing method and the program according to the present technology may be executed by using the computer operated by the user 1 and another computer capable of communicating with the computer operated by the user 1 via a network work or the like. In addition, a content providing system according to the present technology may be built when the computer operated by the user 1 and the other computer work in conjunction with each other.

That is, the information processing method and the program according to the present technology may be executed not only in a computer system configured by a single computer but also in a computer system in which a plurality of computers work cooperatively. It should be noted that in the present disclosure, the system means an aggregate of a plurality of components (device, module (parts), and the like) and it does not matter whether or not all the components are housed in the same casing. Therefore, a plurality of devices housed in separate casings and connected to one another via a network, and a single device having a plurality of modules housed in a single casing are both the system.

The execution of the information processing method and the program according to the present technology by the computer system includes, for example, both of a case where the acquisition of the position and posture information of the eyeballs of the user, estimation of the sightline vector of the user, control over the display device that displays the guide image for showing the gaze state based on the sightline vector, acquisition of the gesture information of the user, switching between the first mode and the second mode, and the like are executed by a single computer and a case where those processes are executed by different computers, for example. Further, the execution of the respective processes by a predetermined computer includes causing the other computer to perform some or all of those processes and acquiring results thereof.

That is, the information processing method and the program according to the present technology are also applicable to a cloud computing configuration in which one function is shared and cooperatively processed by a plurality of devices via a network.

Out of the feature parts according to the present technology described above, at least two feature parts can be combined. That is, the various feature parts described in the embodiments may be arbitrarily combined irrespective of the embodiments. Further, various effects described above are merely examples and are not limited, and other effects may be exerted.

In the present disclosure, the terms "same", "equal", "orthogonal", "perpendicular" and the like are used as concepts that include meanings of "substantially same", "substantially equal", "substantially orthogonal", "substantially perpendicular" and the like. For example, they include states varied within a predetermined range (such as within a range of ±10%) from criterial state such as "perfectly same", "perfectly equal", "perfectly orthogonal", "perfectly perpendicular" and the like.

Note that, the present technology may also be configured as below.

(1) An information processing device, including:

an eyeball information acquisition section that acquires position and posture information of eyeballs of a user from a first sensor;

a sightline estimation section that estimates a sightline vector of the user on the basis of the position and posture information of the eyeballs;

a display control section that controls a display device in such a manner that the display device displays a guide image for showing a gaze state based on the estimated sightline vector;

a gesture information acquisition section that acquires gesture information of the user, which is different from the position and posture information of the eyeballs, from a second sensor; and a mode switching section that switches between a first mode and a second mode according to mode switching input provided by the user with regard to the guide image, the first mode being a mode of reflecting the position and posture information of the eyeballs in the guide image, the second mode being a mode of correcting the gaze state on the basis of the gesture information.

(2) The information processing device according to (1), in which the guide image is an image that shows at least one of a gaze position based on the sightline vector and a gaze object including the gaze position as the gaze state, and the display control section corrects the gaze position on the basis of the gesture information in a case where the second mode is performed.

(3) The information processing device according to (2), in which the display control section controls the display device in such a manner that the display device displays the guide image including a corrected gaze position in a case where the second mode is performed.

(4) The information processing device according to (2) or (3) in which the display control section corrects the gaze position by correcting the sightline vector on the basis of the gesture information.

(5) The information processing device according to any one of (2) to (4), in which the gesture information includes information related to head gesture when the user rotates his/her head, and the display control section controls the display device in such a manner that the display device displays the guide image including the gaze position that is corrected according to rotation of the head of the user in a case where the second mode is performed.

(6) The information processing device according to (5), in which
the display control section rotates the sightline vector in a rotation direction of the head of the user.
(7) The information processing device according to (5) or (6), in which
the display control section sets a rotation angle of the sightline vector according to a rotation angle of the head of the user, in such a manner that the rotation angle of the sightline vector falls within a first range.
(8) The information processing device according to (7), in which
the display control section sets the rotation angle of the sightline vector to a maximum angle in the first range in a case where the rotation angle of the head of the user exceeds a second range.
(9) The information processing device according to (8), in which
the second range is set on the basis of at least one of estimation accuracy of the sightline vector, calibration data of the sightline vector, density of candidate objects serving as candidates for the gaze object, and posture of the head of the user when the second mode is performed.
(10) The information processing device according to any one of (7) to (9), in which
the rotation angle of the head of the user is calculated on the basis of a rotation position of the head of the user when the second mode is performed.
(11) The information processing device according to (5), in which
the display control section continuously moves the gaze position by continuously rotating the sightline vector in a rotation direction of the head of the user regardless of a rotation angle of the head of the user.
(12) The information processing device according to (11), in which
the display control section controls the display device in such a manner that the display device displays the guide image in which the gaze object is switched according to the gaze position, the gaze position being continuously moving.
(13) The information processing device according to any one of (5) to (12), in which
the display control section calculates a relative rotation angle of the head of the user to a moving candidate object serving as a candidate for the gaze object, on the basis of a rotation speed of the head of the user, which moves in tandem with movement of the candidate object.
(14) The information processing device according to any one of (2) to (13), in which
the mode switching section determines the mode switching input on the basis of an initiation condition and a termination condition of the second mode.
(15) The information processing device according to (14), in which
the initiation condition includes at least one of a condition for a time period where the gaze object is gazed at, a condition for presence/absence of operation input provided by the user, and a condition for an amount of change in the sightline vector.
(16) The information processing device according to (14) or (15), in which
the termination condition includes at least one of a condition for behavior of the eyes of the user, a condition for a rotation speed of the head of the user, a condition for presence/absence of operation input provided by the user, and a condition for an amount of change in the sightline vector.

(17) The information processing device according to any one of (1) to (16), in which
the gesture information includes at least one of information related to a body gesture when the user is tilting his/her upper body and information related to a hand gesture when the user is moving his/her hand.
(18) The information processing device according to any one of (1) to (17), in which
the display control section calculates an correction amount for correcting the gaze state in the second mode, and performs display of the guide image in the first mode on the basis of the correction amount.
(19) The information processing device according to any one of (1) to (18), in which
the display control section selects an object having a smallest degree of separation from the sightline vector, as a gaze target of the user from among one or more objects serving as the gaze targets.
(20) The information processing device according to (19), in which
the degree of separation from the sightline vector is an angular interval between the sightline vector and a position vector of the object.
(21) The information processing device according to any one of (1) to (20), in which
the guide image includes one or more objects serving as gaze targets of the user, and
the display control section controls the display device in such a manner that the display device displays the guide image in which display of the respective objects changes according to degrees of separation between one or more objects and the sightline vector.
(22) The information processing device according to (21), in which
the degree of separation from the sightline vector is an angular interval between the sightline vector and the position vector of the object, and
the display control section changes at least one of color, size, shape, and behavior of the one or more objects according to the angular interval.
(23) The information processing device according to any one of (21) or (22), in which
the display control section performs one of a blur process and a hiding process on an object that is not included in a predetermined angular range based on the sightline vector, among the one or more objects.
(24) An information processing method that causes a computer system to:
acquire position and posture information of eyeballs of a user from a first sensor;
estimate a sightline vector of the user on the basis of the position and posture information of the eyeballs;
control a display device in such a manner that the display device displays a guide image for showing a gaze state based on the estimated sightline vector;
acquire gesture information of the user, which is different from the position and posture information of the eyeballs, from a second sensor; and
switch between a first mode and a second mode according to mode switching input provided by the user with regard to the guide image, the first mode being a mode of reflecting the position and posture information of the eyeballs in the guide image, the second mode being a mode of correcting the gaze state on the basis of the gesture information.

(25) A computer-readable recording medium having a program stored thereon, the program executing:

a step of acquiring position and posture information of eyeballs of a user from a first sensor;

a step of estimating a sightline vector of the user on the basis of the position and posture information of the eyeballs;

a step of controlling a display device in such a manner that the display device displays a guide image for showing a gaze state based on the estimated sightline vector;

a step of acquiring gesture information of the user, which is different from the position and posture information of the eyeballs, from a second sensor; and a step of switching between a first mode and a second mode according to mode switching input provided by the user with regard to the guide image, the first mode being a mode of reflecting the position and posture information of the eyeballs in the guide image, the second mode being a mode of correcting the gaze state on the basis of the gesture information.

(26) An information processing device including:

an eyeball information acquisition section that acquires position and posture information of eyeballs of a user from a first sensor;

a sightline estimation section that estimates a sightline vector of the user on the basis of the position and posture information of the eyeballs; and a display control section that controls a display device in such a manner that the display device displays a guide image for showing a gaze state based on the estimated sightline vector, in which the guide image includes one or more objects serving as gaze targets of the user, and the display control section controls the display device in such a manner that the display device displays the guide image wherein display of the respective objects changes according to degrees of separation between one or more objects and the sightline vector.

(27) An information processing device, including:

an eyeball information acquisition section that acquires position and posture information of eyeballs of a user from a first sensor;

a sightline estimation section that estimates a sightline vector of the user on the basis of the position and posture information of the eyeballs; and a display control section that controls a display device in such a manner that the display device displays a guide image for showing a gaze state based on the estimated sightline vector;

in which the display control section selects an object having a smallest degree of separation from the sightline vector, as a gaze target of the user from among one or more objects serving as the gaze targets.

REFERENCE SIGNS LIST

θ angular interval
1 user
2 head
15 display
17 storage section
18 control program
20 controller
21 sightline detection section
22 head position and posture detection section
23 display control section
24 mode switching section
25 sightline direction adjustment section
26 image processing section
30 guide images
40, 40a to 40i virtual object
41 gaze object
42 candidate object
45 selection object
50 real sightline vector
51 sightline vector
52 position vector
70 angular range
100 HMD

The invention claimed is:

1. An information processing device, comprising:

an eyeball information acquisition section configured to acquire position and posture information of eyeballs of a user from a first sensor;

a sightline estimation section configured to estimate a sightline vector of the user on a basis of the position and posture information of the eyeballs;

a display control section configured to control a display device in such a manner that the display device displays a guide image for showing a gaze state based on the estimated sightline vector;

a gesture information acquisition section configured to acquire gesture information of the user, which is different from the position and posture information of the eyeballs, from a second sensor; and a mode switching section configured to switch between a first mode and a second mode according to mode switching input provided by the user with regard to the guide image, the first mode being a mode of reflecting the position and posture information of the eyeballs in the guide image, the second mode being a mode of correcting the gaze state on a basis of the gesture information, wherein the gesture information includes information related to head gesture when the user rotates his/her head, the display control section is further configured to set a rotation angle of the sightline vector according to a rotation angle of the head of the user, in such a manner that the rotation angle of the sightline vector falls within a first range, and the eyeball information acquisition section, the sightline estimation section, the display control section, the gesture information acquisition section, and the mode switching section are each implemented via at least one processor.

2. The information processing device according to claim 1, wherein the guide image is an image that shows at least one of a gaze position based on the sightline vector or a gaze object including the gaze position as the gaze state, and the display control section is further configured to correct the gaze position on a basis of the gesture information in a case where the second mode is performed.

3. The information processing device according to claim 2, wherein the display control section is further configured to control the display device in such a manner that the display device displays the guide image including a corrected gaze position in a case where the second mode is performed.

4. The information processing device according to claim 2, wherein the display control section is further configured to correct the gaze position by correcting the sightline vector on a basis of the gesture information.

5. The information processing device according to claim 2, wherein
the display control section is further configured to control the display device in such a manner that the display device displays the guide image including the gaze position that is corrected according to rotation of the head of the user in a case where the second mode is performed.

6. The information processing device according to claim 5, wherein
the display control section is further configured to rotate the sightline vector in a rotation direction of the head of the user.

7. The information processing device according to claim 5, wherein
the display control section is further configured to set the rotation angle of the sightline vector to a maximum angle in the first range in a case where the rotation angle of the head of the user exceeds a second range.

8. The information processing device according to claim 7, wherein
the second range is set on a basis of at least one of estimation accuracy of the sightline vector, calibration data of the sightline vector, density of candidate objects serving as candidates for the gaze object, or posture of the head of the user when the second mode is performed.

9. The information processing device according to claim 5, wherein
the rotation angle of the head of the user is calculated on a basis of a rotation position of the head of the user when the second mode is performed.

10. The information processing device according to claim 5, wherein
the display control section is further configured to continuously move the gaze position by continuously rotating the sightline vector in a rotation direction of the head of the user regardless of a rotation angle of the head of the user.

11. The information processing device according to claim 10, wherein
the display control section is further configured to control the display device in such a manner that the display device displays the guide image, and
the gaze object is switched according to the gaze position, the gaze position being continuously moving.

12. The information processing device according to claim 5, wherein
the display control section is further configured to calculate a relative rotation angle of the head of the user to a moving candidate object serving as a candidate for the gaze object, on a basis of a rotation speed of the head of the user, which moves in tandem with movement of the candidate object.

13. The information processing device according to claim 2, wherein
the mode switching section is further configured to determine the mode switching input on a basis of an initiation condition and a termination condition of the second mode.

14. The information processing device according to claim 13, wherein
the initiation condition includes at least one of a condition for a time period where the gaze object is gazed at, a condition for presence/absence of operation input provided by the user, or a condition for an amount of change in the sightline vector.

15. The information processing device according to claim 13, wherein
the termination condition includes at least one of a condition for behavior of the eyeballs of the user, a condition for a rotation speed of the head of the user, a condition for presence/absence of operation input provided by the user, and a condition for an amount of change in the sightline vector.

16. The information processing device according to claim 1, wherein
the gesture information includes at least one of information related to a body gesture when the user is tilting his/her upper body or information related to a hand gesture when the user is moving his/her hand.

17. The information processing device according to claim 1, wherein
the display control section is further configured to calculate a correction amount for correcting the gaze state in the second mode, and perform display of the guide image in the first mode on a basis of the correction amount.

18. The information processing device according to claim 1, wherein
the display control section is further configured to select an object having a smallest degree of separation from the sightline vector, as a gaze target of the user from among one or more objects serving as the gaze targets.

19. The information processing device according to claim 18, wherein
the degree of separation from the sightline vector is an angular interval between the sightline vector and a position vector of the object.

20. The information processing device according to claim 1, wherein
the guide image includes one or more objects serving as gaze targets of the user,
the display control section is further configured to control the display device in such a manner that the display device displays the guide image, and
display of respective objects changes according to degrees of separation between one or more objects and the sightline vector.

21. The information processing device according to claim 20, wherein
the degree of separation from the sightline vector is an angular interval between the sightline vector and a position vector of the object, and
the display control section is further configured to change at least one of color, size, shape, or behavior of the one or more objects according to the angular interval.

22. The information processing device according to claim 20, wherein
the display control section is further configured to perform one of a blur process and a hiding process on an object that is not included in a predetermined angular range based on the sightline vector, among the one or more objects.

23. An information processing method comprising:
acquiring position and posture information of eyeballs of a user from a first sensor;
estimating a sightline vector of the user on a basis of the position and posture information of the eyeballs;
controlling a display device in such a manner that the display device displays a guide image for showing a gaze state based on the estimated sightline vector;

acquiring gesture information of the user, which is different from the position and posture information of the eyeballs, from a second sensor;

switching between a first mode and a second mode according to mode switching input provided by the user with regard to the guide image, the first mode being a mode of reflecting the position and posture information of the eyeballs in the guide image, the second mode being a mode of correcting the gaze state on a basis of the gesture information, the gesture information including information related to head gesture when the user rotates his/her head; and setting a rotation angle of the sightline vector according to a rotation angle of the head of the user, in such a manner that the rotation angle of the sightline vector falls within a first range.

24. A non-transitory computer-readable medium having embodied thereon a program, which when executed by a computer causes the computer to execute an information processing method, the method comprising:

acquiring position and posture information of eyeballs of a user from a first sensor;

estimating a sightline vector of the user on a basis of the position and posture information of the eyeballs;

controlling a display device in such a manner that the display device displays a guide image for showing a gaze state based on the estimated sightline vector;

acquiring gesture information of the user, which is different from the position and posture information of the eyeballs, from a second sensor;

switching between a first mode and a second mode according to mode switching input provided by the user with regard to the guide image, the first mode being a mode of reflecting the position and posture information of the eyeballs in the guide image, the second mode being a mode of correcting the gaze state on a basis of the gesture information, the gesture information including information related to head gesture when the user rotates his/her head; and setting a rotation angle of the sightline vector according to a rotation angle of the head of the user, in such a manner that the rotation angle of the sightline vector falls within a first range.

* * * * *